(12) United States Patent
Jacobson

(10) Patent No.: US 8,870,137 B2
(45) Date of Patent: Oct. 28, 2014

(54) ADJUSTABLE HANDS-FREE MOUNTING APPARATUS FOR TABLET PCS WITH EXPANDED DESCRIPTION OF ITS MINIATURE SUBCOMBINATIONS

(71) Applicant: Stephen R. Jacobson, Miami Beach, FL (US)

(72) Inventor: Stephen R. Jacobson, Miami Beach, FL (US)

( * ) Notice: Subject to any disclaimer, the term of this patent is extended or adjusted under 35 U.S.C. 154(b) by 0 days.

(21) Appl. No.: 14/070,529

(22) Filed: Nov. 2, 2013

(65) Prior Publication Data

US 2014/0054430 A1 Feb. 27, 2014

Related U.S. Application Data

(63) Continuation-in-part of application No. 13/888,354, filed on May 6, 2013, and a continuation-in-part of application No. 13/220,309, filed on Aug. 29, 2011, now Pat. No. 8,474,778.

(51) Int. Cl.
| | | |
|---|---|---|
| *A47G 1/24* | (2006.01) | |
| *B60R 11/02* | (2006.01) | |
| *F16M 11/04* | (2006.01) | |
| *F16M 13/00* | (2006.01) | |
| *F16M 13/02* | (2006.01) | |
| *B60R 11/00* | (2006.01) | |

(52) U.S. Cl.
CPC ...... *F16M 13/022* (2013.01); *B60R 2011/0084* (2013.01); *B60R 2011/0056* (2013.01); *B60R 11/0252* (2013.01); *F16M 11/041* (2013.01); *F16M 13/00* (2013.01); *B60R 2011/0075* (2013.01)
USPC ................... 248/222.51; 248/299.1; 248/492; 248/495

(58) Field of Classification Search
USPC .............. 248/206.2, 222.51, 299.1, 492, 495, 248/448; 40/617
See application file for complete search history.

(56) References Cited

U.S. PATENT DOCUMENTS

| | | | | |
|---|---|---|---|---|
| 662,089 | A * | 11/1900 | Pettey | 211/115 |
| 1,340,066 | A * | 5/1920 | Lemle | 160/331 |
| 1,614,818 | A * | 1/1927 | Basford | 248/166 |
| 1,814,104 | A * | 7/1931 | Wolff | 472/7 |
| 3,195,849 | A * | 7/1965 | Maddox | 248/441.1 |
| 3,550,291 | A * | 12/1970 | Albright | 434/419 |
| 4,080,673 | A * | 3/1978 | Weisler | 5/658 |
| 4,239,170 | A * | 12/1980 | Planebo | 248/447.1 |
| 4,684,099 | A * | 8/1987 | Krapf | 248/447.1 |
| 5,370,060 | A * | 12/1994 | Wang | 108/44 |
| 5,423,820 | A * | 6/1995 | Miller et al. | 606/74 |
| 5,529,274 | A * | 6/1996 | Anderson et al. | 248/329 |
| 5,694,881 | A * | 12/1997 | Creech | 116/222 |

(Continued)

*Primary Examiner* — Terrell McKinnon
*Assistant Examiner* — Daniel Breslin
(74) *Attorney, Agent, or Firm* — Ian P. Coyle

(57) ABSTRACT

This disclosure of the previously presented invention describes a small sized collapsible frame for use in certain embodiments of said apparatus for adjustably mounting a tablet PC or other personal electronic device, including additional examples of its many adjustment and attachment features. A mounting means, such as a suction cup assembly, is attachable to various surfaces and is connected to a hanger from which cordage or straps descend to the suspended frame. The miniaturized frame features a crossover arrangement of two slats enabling expansion and contraction of either a width or a height dimension of said frame. The invention comprises various swappable stabilizer elements to separately regulate the orientation and attachment of the mounted device(s) to any surface; and herein, the threadable stabilizer cleats that attach to the cordage are described in particular detail.

11 Claims, 28 Drawing Sheets

(56) References Cited

U.S. PATENT DOCUMENTS

| | | | |
|---|---|---|---|
| 5,993,452 A * | 11/1999 | Vandewalle | 606/74 |
| 6,327,803 B1 * | 12/2001 | Ruderman | 40/601 |
| 6,690,287 B2 * | 2/2004 | Jette et al. | 340/691.7 |
| 6,830,292 B1 * | 12/2004 | Yoda | 297/188.06 |
| 6,854,202 B1 * | 2/2005 | Ives et al. | 40/491 |
| 7,156,356 B2 * | 1/2007 | Blattner | 248/440 |
| 7,255,701 B2 * | 8/2007 | Allen et al. | 606/74 |
| 7,568,915 B1 * | 8/2009 | Lavoie | 434/408 |
| 7,628,717 B2 * | 12/2009 | Purcell et al. | 473/483 |
| 7,862,112 B2 * | 1/2011 | Caturla et al. | 297/163 |
| 8,360,374 B2 * | 1/2013 | Truitt | 248/171 |
| 8,474,778 B2 * | 7/2013 | Jacobson | 248/492 |
| 2013/0048809 A1 * | 2/2013 | Jacobson | 248/206.2 |
| 2013/0240693 A1 * | 9/2013 | Jacobson | 248/205.8 |
| 2014/0054430 A1 * | 2/2014 | Jacobson | 248/295.11 |

* cited by examiner

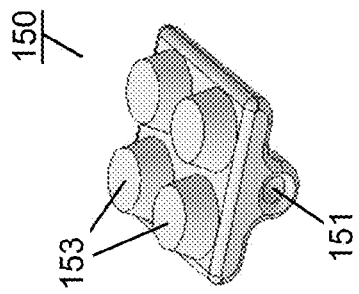
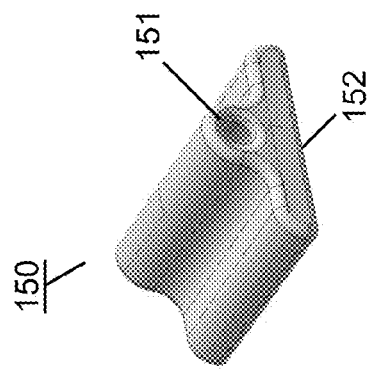
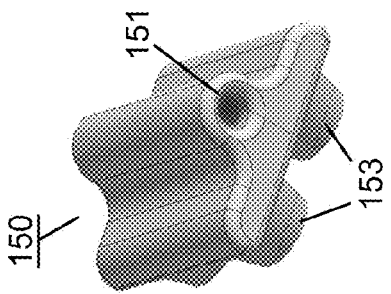
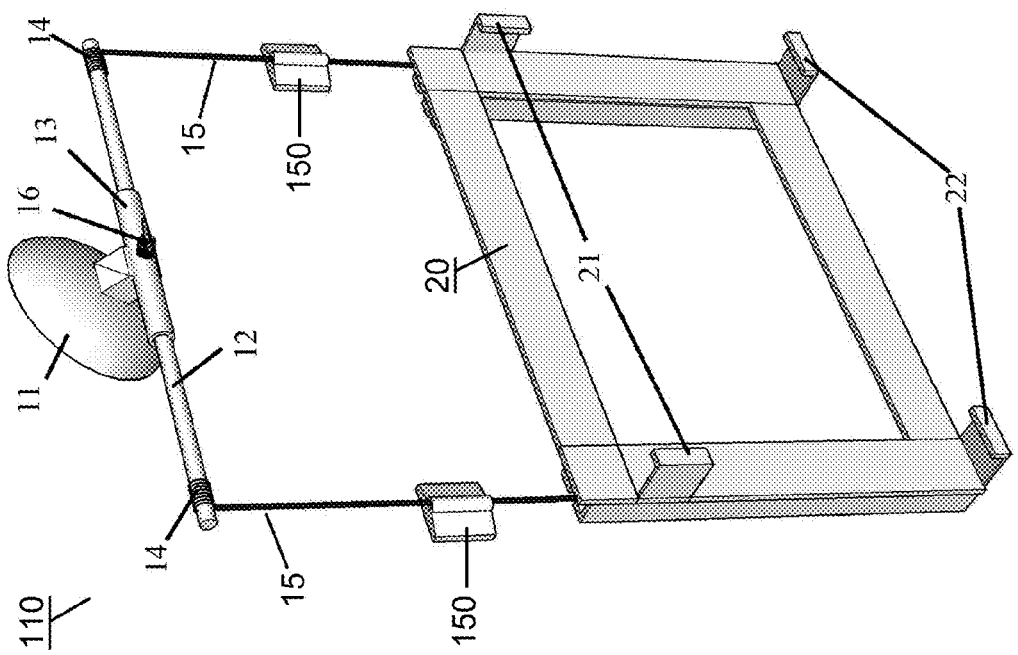

ADJUSTABLE HANDS-FREE MOUNTING APPARATUS FOR TABLET PCS WITH EXPANDED DESCRIPTION OF ITS MINIATURE SUBCOMBINATIONS

CROSS REFERENCE TO RELATED APPLICATIONS

This application is a continuation-in-part ("CIP") of, and claims the priority benefit of, pending U.S. application Ser. No. 13/888,354 filed May 6, 2013, the entirety of which is incorporated by reference herein and which in turn is a CIP of U.S. application Ser. No. 13/220,309 filed Aug. 29, 2011 which issued as U.S. Pat. No. 8,474,778 on Jul. 2, 2013.

BACKGROUND OF THE INVENTION

1. Field of the Invention

The invention relates to the apparatus for adjustably mounting tablet PC's and other electronic devices for hands-free emplacement in a diverse range of environments; whereas the apparatus of the invention has been previously distinguished for comprising a multiplicity of distinct adjustment features that collectively provide exceptional adaptability and stability, herein are described embodiments that are relatively miniature in size; in particular, a small adjustable frame of the invention suitable for holding very mall devices and which is fully collapsible, and a stabilizer means of the invention which comprises a cleat that attaches to the cordage above the frame.

2. Description of the Related Art

The proceeding written description recapitulates verbatim that of the pending parent application. Any and all additions or changes relative to said parent application have been added after the last line of the text herein that corresponds to the last line of U.S. Pat. App. Pub. No. 2013/0240693, and thus they begin in this application with the subheading "Miniature Parts for the Several Embodiments;" the only exceptions are the seven paragraphs that provide the "brief description of the drawings" for FIGS. 23 through 26. The following review of related art is intended to provide edifying examples of problems and pitfalls in the design and use of personal computer mounting apparatuses. No admission is made that any reference, including any patent or patent document, cited in this specification constitutes prior art with respect to the present invention. Applicant reserves the right to challenge the accuracy and pertinence of any of the documents cited herein.

The "tablet PC" is a portable personal computer (PPC) generally characterized by a prominent touch-screen interface and a thin rectangular geometry that is rapidly becoming the preferred personal digital accessory (PDA) among consumers. Tablet PCs emphasize the capacity for powerful full-range personal computing and necessarily possess larger dimensions and heavier weights than prior PDAs, which generally comprise cellular phones, music players, digital cameras, or GPS navigators. The PDAs in the prior art prioritize their respective consumer electronics functions and marginalize personal computing capacity, placing a premium on achieving miniaturization rather than versatility. Although these distinctions are merely trends and not rules, and are not intended to limit the scope of the present invention, they are manifested in the failure of prior art PDA mounting devices to accommodate the substantially greater bulk and weight of tablet PCs. Prior art mounting apparatuses are too fragile for, too unstable for, and fundamentally incompatible with tablet PCs and related PPCs.

A popular solution to the mounting requirements of tablet PCs in a stationary environment on a horizontal surface is disclosed in U.S. Pat. No. 7,969,732 to Noble. The Noble device comprises a groove in a pedestal which receives an edge of a tablet PC, holding it upright by action of gravity alone. Although convenient and rapidly assembled, the Noble device provides no stabilizing function to hold the mounted tablet PC in a moving environment, i.e., during travel, or upon a non-horizontal surface. U.S. Pat. No. 5,607,135 to Yamada presents a similar tablet stand concept having an adjustable angle of support, but which is still susceptible to dislodgment during travel-associated movement.

The particular difficulty of mounting a tablet PC in a moving vehicle is expressed in the elaborate solution proposed in U.S. Pat. App. No. 2011/0114686 to Franzi. The Franzi invention resembles a child safety chair, occupying an entire passenger seat in a vehicle, having a swiveling armature for bolting or engaging the back of a tablet PC or other portable computer. Although secure against lateral motion and hard-braking, the Franzi invention occupies an excessive amount of space inside the travel compartment and requires a driver to look away from the road in order to view the screen.

U.S. Pat. No. 7,861,985 to Galvin discloses an apparatus for securing small, lightweight PDAs to various surfaces, the apparatus comprising a mounting means in the form of a common spring clip that is in turn connected by a flexible gooseneck to a universal belt clip that attaches to the PDA. Although the Galvin invention is heralded as a travel accessory, the security of the mounting attachment is dependent upon the grip of the spring clip, which is notorious for slipping off of surfaces unless the surfaces possess precisely square, non-slippery, protruding edges less than about 2-3 inches wide. Such surfaces are rarely present inside automobiles, airplanes, buses, and most other common means of travel. Instead, the Galvin invention in practice must be clipped to the curvy plastic surfaces of dashboards, consoles, meal trays, or arm-rests which are almost always coated in some form of slippery organic solvent or substance and further destabilized by vibration and turbulence during travel. Another drawback of this invention is the obtrusiveness of the long gooseneck, which not only acts as a lever, placing greater destabilizing force upon the spring clip in proportion to the weight of the PDA mounted on its proximal end, but which also is not adjustable lengthwise, and therefore becomes an inconvenient obstacle, preventing access to the area behind the mounted computer and intruding undesirably into the interior of the cabin or space occupied by a traveling user. The Galvin device and the numerous related prior art devices discussed in the Galvin disclosure may be suitable for holding small music players or smart phones, but they cannot be reliably used for mounting a relatively large and heavy tablet PC of the types that predominate in the marketplace today, particularly inside a car or other moving vehicle.

Clips or frames attached directly to suction cups are the predominant method for reversibly mounting PDAs including GPS navigation devices in automobiles, and on non-horizontal surfaces. U.S. Pat. App. Pub. No. 2011/0073743 to Shamie describes a device virtually identical to the Galvin device except the spring clip has been replaced with a suction cup. U.S. Pat. App. Pub. No. 2010/0274483 to Wikel describes a suction cup that attaches to the inside of the windshield or to the top surface of a dashboard, accommodating a PDA via a connector adjacent to the suction cup. Neither of these prior art devices are suitable for holding a tablet PC because of its relatively large width and heavy weight compared to GPS devices and smart phones. With regard to travel use, the interior slope of the windshield in most cars limits the size of a mounted device to 3-4 inches if mounted above the dashboard, and the heavy weight of a tablet PC will overcome the strength of any gooseneck arm if extended horizontally away from the windshield into the passenger area beyond the dashboard.

Scant incentives exist for promoting the development of greater weight and size capacities in existing dashboard clips and windshield suction cup devices for good reason, because the bulk of heavier, larger devices such as tablet PCs would obscure a significant portion of a driver's view through the windshield, and when such bulky devices are extended by a gooseneck or other arm several inches into the passenger compartment in order to space them sufficiently far away from the windshield that they can present their screens vertically, they become a distracting and potentially dangerous physical obstruction. Consequently, most larger PPCs and video screens are installed permanently, and not removeably, in the center consoles of a dashboard, rear panels of a seatback, or panels attached to the ceiling.

U.S. Pat. No. 7,894,003 to Chang exemplifies the permanently mounted type of apparatus that is commonly used to hold computer devices and screens in the ceiling or seat-backs of vehicles ranging from automobiles to airplanes. Unfortunately, the Chang device and its related inventions are not adapted for portability or for reversible assembly, and therefore they are not amenable to a traveler who desires to quickly remove the screen and hardware components when exiting a vehicle or to quickly install them upon entering a vehicle. Furthermore, these mounting devices are not particularly suitable for touch-screen control since they are mounted overhead, beyond the comfortable reach of a seated person, or alternatively when they are mounted in a seatback, excluding access from the driver's seat and front passenger seat of a car, which is where the majority of consumers would prefer to have access to their tablet PCs while traveling.

Suction cup mounting devices which suspend any electronic device in front of a windshield present particular hazards to the passengers of the vehicle in the event of an accident. For example, U.S. Pat. No. 7,857,268 to Chiu provides a robust mounting apparatus for PDAs that contains a rigid metal frame suspended in a windshield by two suction cups. Not only does the Chiu invention significantly obstruct the view through the windshield, but also it represents a grave hazard if any accident should occur that resulted in the shattering of the windshield, which would dislodge the heavy metal mounting device and send it hurling through the passenger compartment at head-level.

As a result of the shortfalls in the prior art, an unmet need exists for an apparatus that permits the rapid, convenient, versatile, and finely adjustable emplacement of PPCs in diverse environments to enable convenient and reliable operation during travel, fieldwork, rescue operations, and other endeavors where a stable desklike surface is not likely to be available and where alternation between locations is expected. Any satisfactory solution to this unmet need requires that the screen of a tablet PC be positionable in a substantially stable and accessible orientation regardless of the underlying substrate. In particular, a user traveling in the passenger compartment of a vehicle must be able to view and manipulate the graphical user interface (GUI) of the tablet PC screen while seated and facing forward. The solution to this unmet need must provide a mounting apparatus that resists the destabilizing effects of turbulence, vibrations, lateral movement, and other disruptions without being so massive as to significantly impede a driver's view through a windshield, increase the clutter of a compartment, or obstruct the accessibility of an area. The ideal apparatus should be, in some embodiments, easily reversibly mountable so that a user can quickly move from one location or vehicle to another, while in other embodiments the mounting means should emphasize strength and permanence.

SUMMARY OF THE INVENTION

The present invention satisfies the needs described above. This invention provides an apparatus for adjustable mounting and emplacement of tablet PCs and other PPCs in any location. The apparatus can be configured to securely hold all commercially available tablet PCs and is not limited in applicability to any particular types of mounting substrates or conditions. In its most basic conceptualization, the invention comprises (1) a mounting means for attachment to various surfaces, flexibly connected to (2) an adjustably positionable frame for holding a tablet PC in a desired orientation. The flexible relationship between a dedicated mounting means and an independently positionable frame enhances the precision and security by which a tablet PC can be reversibly installed upon non-horizontal surfaces. The apparatus of the present invention thus enables the optimized emplacement of a tablet PC permanently or temporarily in any space, no matter how confined or irregular, making it exceptionally well-suited for use during travel in moving vehicles, participation in rigorous activities, reliability in rugged conditions, and adaptability to unforeseen circumstances.

In a preferred embodiment, the apparatus comprises a suction cup assembly as the mounting means connected to a rigging from which adjustable-length cordage descends to the top edge of a rectangular frame. The cordage suspends the frame vertically, while the frame holds a tablet PC between opposing lateral ledges or clips, such that the tablet PC touch screen is presented and maintained in an upright, forward-facing, unobstructed orientation. A user of the apparatus adjusts the cordage to regulate the distance between the mounting means and the frame to establish a preferred operating position. Additional stabilizing elements on the frame may interact with surfaces separate from the attachment substrate of the mounting means to further adjust and stabilize the emplacement of the tablet PC. The tablet PC may be conveniently removed from and inserted into the frame of the apparatus without significant effort on the part of the user and without significant assembly or disassembly of any part of the apparatus.

The present invention contemplates that a popular use for tablet PCs and related PPCs is for navigation during vehicular travel by virtue of navigation hardware and software contained therein, and the invention performs by enabling easy access by a driver or passenger of a vehicle to the screen of the tablet PC in order to operate it in a safe manner during travel. The present invention resides not merely in any one of the features set forth in this specification, but also in the particular combination of all of the features and improvements claimed.

The forgoing summary has outlined some features consistent with the present invention in order that the following detailed description thereof may be better understood, and in order that the present contribution to the art may be better appreciated. The present invention is not limited in its application, details, or components merely to those set forth in the following description and illustrations. Methods and devices consistent with the present invention are capable of other embodiments. Also, the phraseology and terminology employed herein are for the purpose of description and should not be regarded as limiting unless explicitly stated as such.

BRIEF DESCRIPTION OF THE DRAWINGS

FIG. 24 is a front perspective view of the preferred embodiment of the apparatus further comprising miniature stabilizers of the invention which each constitute a threadable stabilizer cleat attached to the cordage.

FIG. 25A is an enlarged top-front perspective view of a preferred embodiment of the threadable stabilizer cleat.

FIG. 25B is an enlarged top-front perspective view of the preferred embodiment of the threadable stabilizer cleat further comprising a gripping means having four rubber feet for contacting an attachment surface in the environment.

FIG. 25C is an enlarged bottom-front perspective view of the preferred embodiment of the threadable stabilizer cleat further comprising the gripping means having four rubber feet.

DETAILED DESCRIPTION OF THE DRAWINGS

Figure 1:
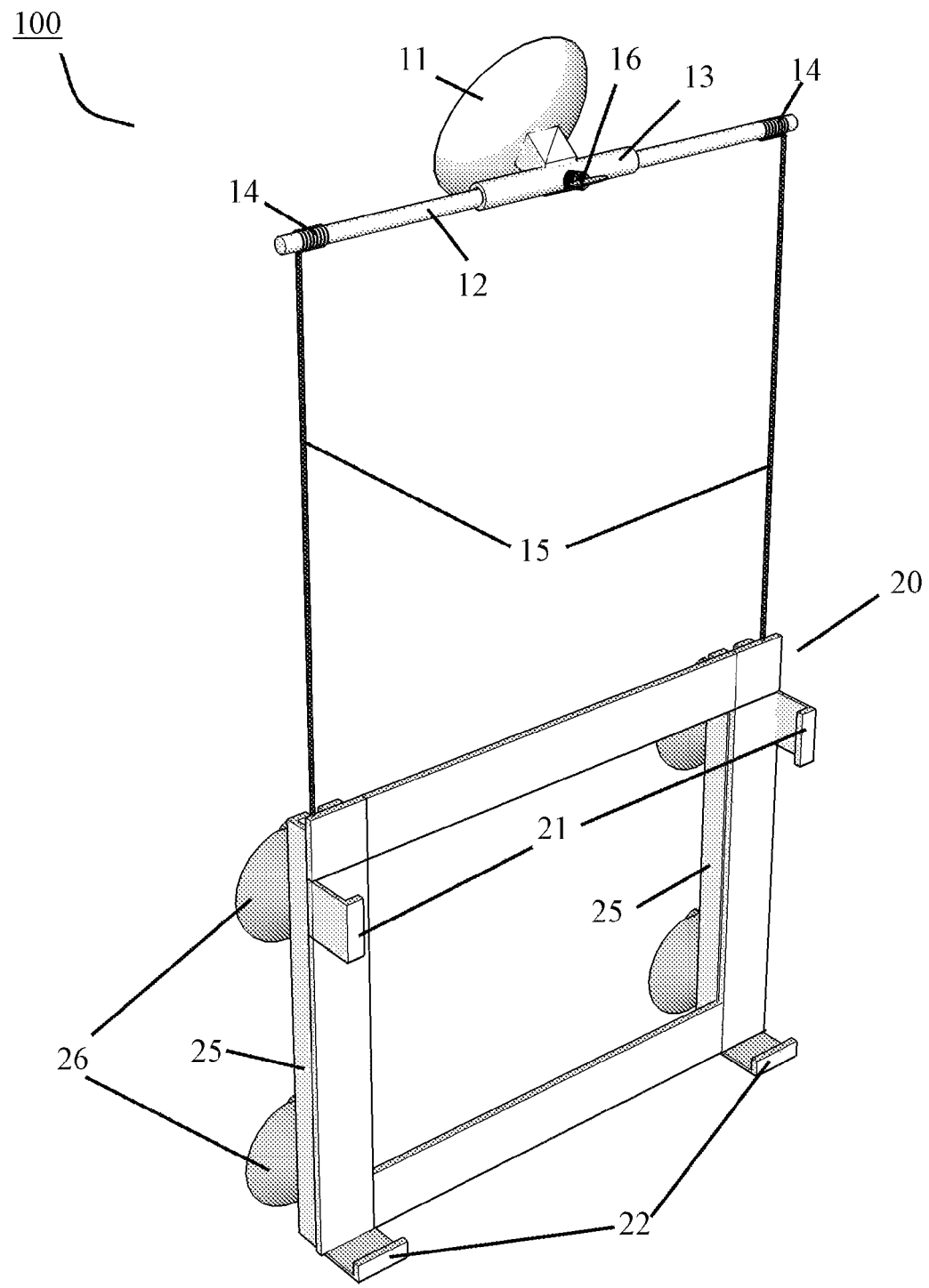
FIG. 1 is a perspective view of a preferred embodiment of the apparatus.

Throughout all the figures, same or corresponding elements are indicated by the same reference numerals. FIG. 1 is a perspective view of a preferred embodiment of the apparatus 100 in which a mounting means 11 comprises a suction cup assembly. The mounting means 11 may alternatively comprise a magnet, adhesive, bracket, screws, ball and socket, spring clip, and any other structure tending to achieve attachment to a surface. The mounting means 11 may also, or alternatively, comprise any elements useful for attachment of the apparatus 100 to a feature on a surface or in the environment. For example, although the suction cup assembly of the mounting means 11 depicted in FIG. 1 is ideal for attachment to a substantially smooth surface, the mounting means 11 in other embodiments of the invention may be adapted for hanging the apparatus 100 on a hook or similar protrusion, or for suspension of the apparatus 100 from the headrest of a car seat or from a rear-view mirror.

The mounting means 11 is connected to a hanger 12, either directly or via a connector element 13. The hanger 12 is attached to cordage 15, and said cordage 15 is connected to a frame 20 for holding a tablet PC or other personal computing device. The cordage 15 is variably connected to an adjustment means 14 for adjusting the length of the cordage 15 that extends between the hanger 12 and the frame 20, thereby enabling the adjustment of the position of the frame 20 relative to the position of the mounting means 11. In other words, the adjustment means 14 adjusts the effective length of the cordage 15 to raise and lower the frame 20. The operation of the adjustment means may be modulated by the action of a tensioning element 16. Generally, the tensioning element 16 provides a means for alternatively preventing or allowing the operation of the adjustment means 14, thereby preventing or allowing the adjustment of the effective length of the cordage 15, and thereby preventing or allowing the adjustment of the position of the frame 20 in relation to the position of the mounting means 11.

In the embodiment of FIG. 1, the hanger 12 is a horizontal rod attached to the connector element 13 in proximity to the mounting means 11. The cordage 15 comprises two strands of filament, wherein each strand of filament connects at one end to the hanger 12 and at an opposite end to the frame 20. The adjustment means 14 comprises a means for wrapping and unwrapping the cordage 15 about the rod of the hanger 12. In particular, the adjustment means 14 comprises a localized attachment between an end of the cordage 15 where the cordage 15 is bound to an end portion of the hanger 12 and where the cordage 15 can be wrapped and unwrapped around an end portion of the hanger 12. Said wrapping and unwrapping of the cordage 15 around the hanger 12 effectively alters the length of the cordage 15 which extends to the frame 20, thereby enabling the raising and lowering of the position of the frame 20 relative to the position of the mounting means 11. The cordage 15 as shown in FIG. 1 extends directly vertically downwards towards the frame 20, at a ninety (90) degree angle relative to the horizontal axis of the frame 20, but this is not limiting, and the cordage 15 may in practice extend at any angle from either the hanger 12 or the frame 20.

In the embodiment of FIG. 1, the horizontal rod of the hanger 12 is held in place by, and sits within, the connector element 13. The horizontal rod of the hanger 12 is rotatable along its longitudinal axis within the connector element 13, except when said rotation is prevented by the action of a tensioning element 16. The tensioning element 16 is a thumbscrew threaded through the connector element 13 that impinges upon the rotatable rod of the hanger 12 to prevent it from rotating within the connector element 13 when in a tightened position. Loosening of the tensioning element 16 permits the rotation of the rod of the hanger 12 and is accomplished by rotating the thumbscrew through several revolutions a counterclockwise direction. Tightening of the tensioning element 16 prevents the rotation of the rod of the hanger 12 and is accomplished by turning the thumbscrew in a clockwise direction. Rotation of the rod of the hanger 12 enables the adjustment of the length of the cordage 15 by causing the cordage 15 to wind or unwind around the end portion of the hanger 12 comprising the adjustment means 14. In alternative embodiments, the tensioning element 16 may be a constricting collar attached to the connector element 13 where the rotatable rod of the hanger 12 exits the connector element 13, said constricting collar being made to grip the rod of the hanger 12 to thereby prevent its rotation.

When a tablet PC is held by the frame 20, the position of the tablet PC may be lowered by extending the length of the cordage 15 between the horizontal rod of the hanger 12 and the frame 20. In the preferred embodiment of FIG. 1, the length of the cordage 15 is extended by first loosening the screw of the tensioning element 16, and then by rotating the horizontal rod of the hanger 12 about its longitudinal axis, thereby unwinding the cordage 15 about the adjustment means 14 of the rod of the hanger 12, and thereby moving the frame 20 farther away from the mounting means 11. Rotation of the rod of the hanger 12 may be achieved, for example, by the application of downwards force upon the cordage 15 which is wrapped around the adjustment means 14 of the rod of the hanger 12. The downwards force may result from the weight of the frame 20 or from manual application by a user. In order to raise the height of the tablet PC, a person manually turns the rotatable rod of the hanger 12 while the tensioning element 16 is in a loosened position. When the tablet PC rests in the frame at a position satisfactory to the user, the tensioning element 16 is tightened to prevent further rotation of the rod of the hanger 12.

Alternatively, the length of the cordage 15 may be manually adjusted by wrapping or unwrapping cordage 15 around the portion of the hanger 12 comprising the adjustment means 14 to effect a change in the positioning of the frame 20. Such a method would be useful in situations when it is not feasible to adjust the tensioning element 16 or to rotate the rod of the hanger 12, or in embodiments that do not include a tensioning element 16 or do not employ a rotatable rod as the hanger 12. In some embodiments, the adjustment means 14 is a motorized spool that adjusts the length of the cordage 15 by winding and unwinding under electronic control, and the hanger 12 may comprise a hollow tube through which the cordage 15 is threaded rather than a rotatable rod around which the cordage 15 is wrapped. Alternatively, in further embodiments there may be no rod at all, and the hanger 12 comprises only a motorized spool attached to the connector element 13 and/or the mounting means 11. The tensioning element 16 may also comprise electromagnetic resistance or other resistance within a motor which tends to resist rotation of a means for spooling cordage.

The cordage 15 may comprise any equivalent of a cord, strap, rope, or wire that is sufficiently durable to support the weight of the frame 20 when holding a PPC. The cordage 15 may comprise various materials appropriately selected for the location in which the user desires to mount the apparatus 100. If the apparatus 100 is used in a vehicle, for example, the cordage 15 can be thin and/or non-opaque, e.g., monofilament fishing line, so as not to obscure the driver's view. If the apparatus 100 is to be mounted from a seat in a car, airplane, or other seating area, such that the frame 20 is situated against the rear side of said seat for use by a person located behind said seat, the cordage 15 may comprise straps made of fabric. Alternatively, the cordage 15 may be any nylon, polyester, cotton, or similar material in the form of a line or strap.

A four-sided frame 20 is connected to the cordage 15. The frame 20 may be made of any material such as plastic, rubber, paper, woven fabric, or metal. In FIG. 1 the frame 20 is depicted having a solid inflexible plastic construction, but the invention comprises frames made of flexible materials like rubber, canvass, nylon, cotton, or the like, which may or may not be reinforced by rigid internal supporting members to provide consistency of shape.

Attached to the frame 20 near each of its corners are four clips, arranged in two pairs, described as an upper clip pair 21 and a lower clip pair 22. Each of the clip pairs 21 or 22 comprises two individual clips facing inwards relative to the perimeter of the frame 20. The clips of the upper clip pair 21 face inwards towards each other along the x-axis or horizontal axis of the frame 20. Conversely, the clips of the lower clip pair 22 face upwards along the y-axis or vertical axis of the frame 20. This substantially transverse orientation of the clip pairs 21 and 22 enhances the stability of the attachment between the frame 20 and the tablet PC, particularly during travel, because it allows the clips to hold the tablet PC from the bottom and sides simultaneously in order to prevent the tablet PC from sliding off the frame 20 during horizontal and lateral motion. This advantageous feature of the invention, having dual clip pairs in substantially transverse orientations located near the corners of a frame, provides maximum attachment stability for a tablet PC while using a minimum of materials.

Figure 2A:
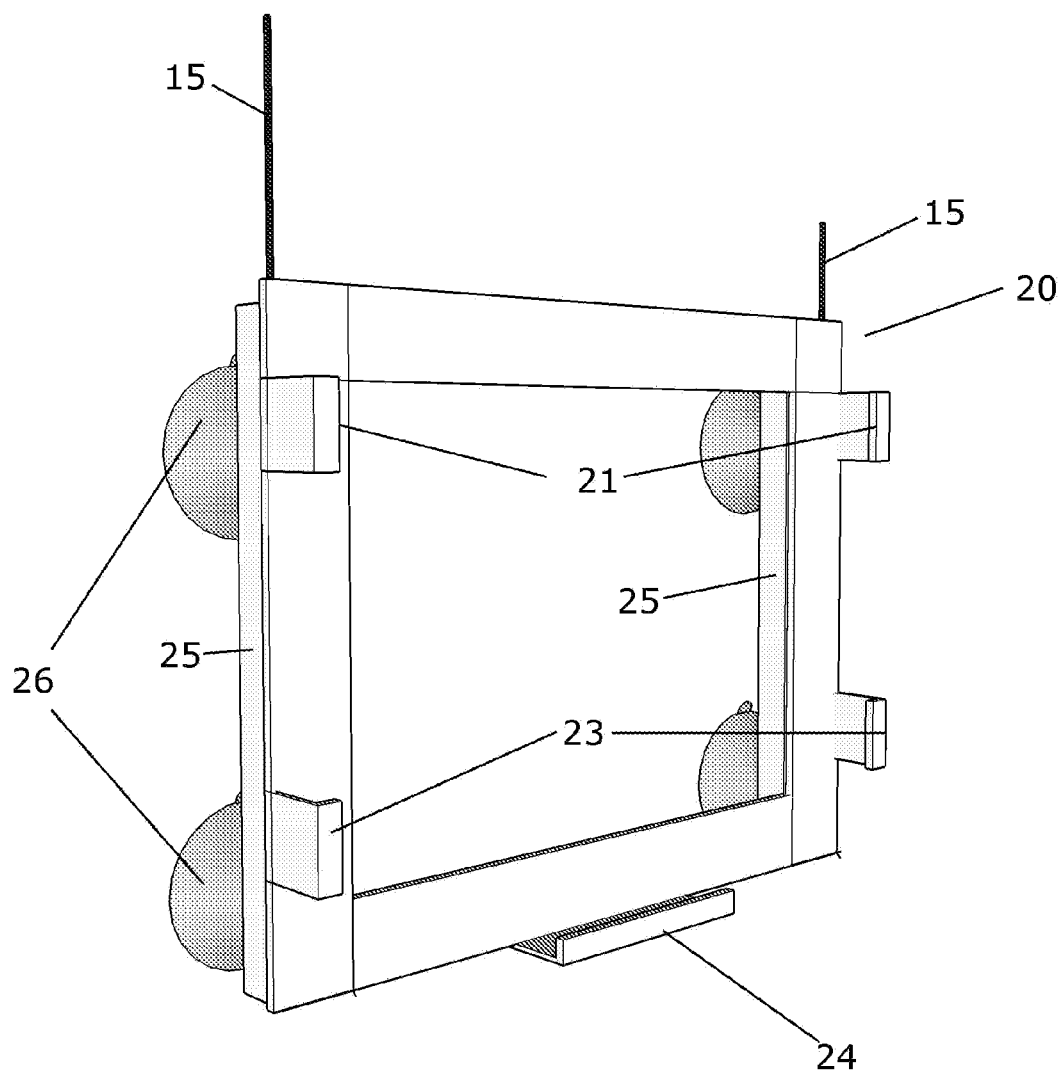
FIG. 2A is a perspective view of a preferred embodiment of the apparatus showing an alternative arrangement of clips on the frame.
Figure 2B:
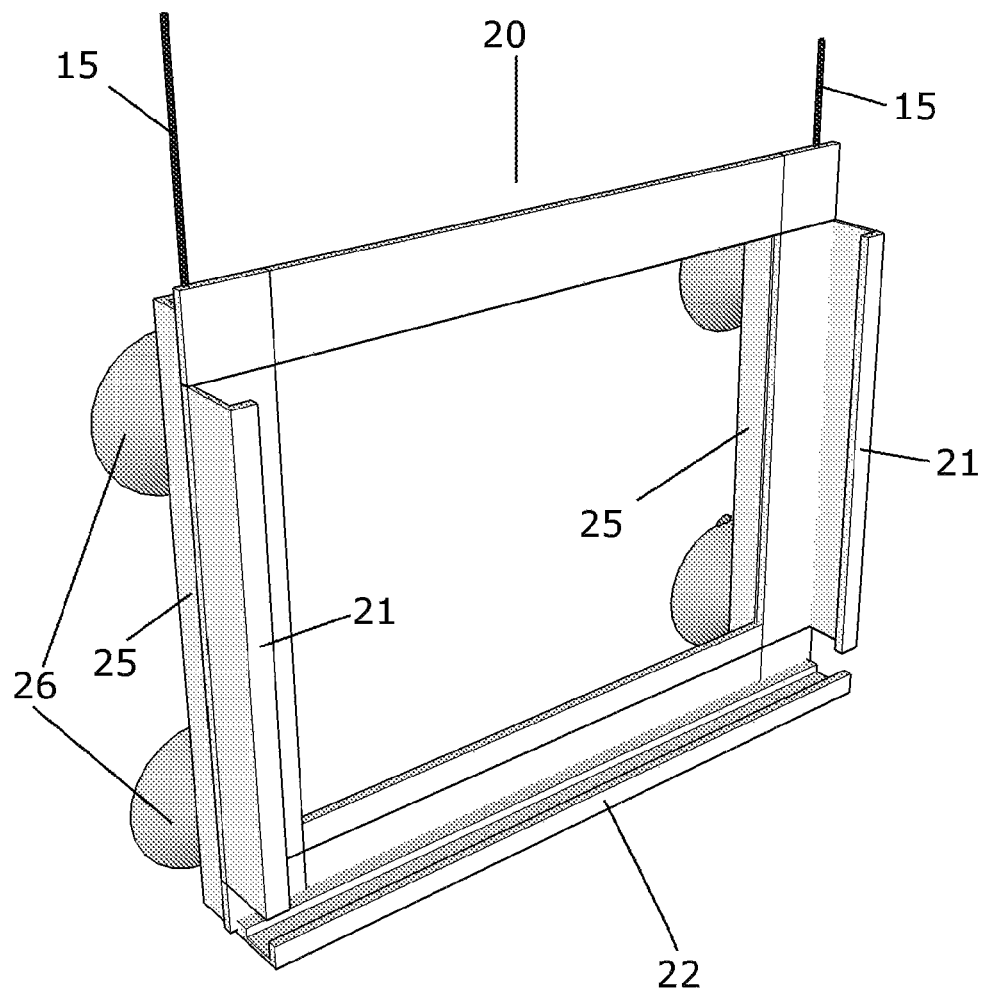
FIG. 2B is a perspective view of a preferred embodiment of the apparatus in which the clips are elongated on the frame.

Sometimes, using the minimum amount of materials is not advantageous, and so each of the clips may be wider than those shown in FIG. 1. Whereas the clips shown in FIG. 1 may be, for example, 0.25 to 1.0 inches wide, clips in other embodiments could be several inches wide and may even extend for substantially the full length of any side of the frame 20. Alternatively, as shown in FIG. 2A, an additional set of clips, clip pair 23, can be attached in a parallel orientation below clip pair 21 in embodiments where increased support for the tablet PC is desired. On the bottom edge of the frame 20, the two clips of clip pair 22 may be merged into a single clip 24. In embodiments of the invention in which conservative use of materials is not desired, clips may extend substantially along the entire lengths of the left, right, and bottom edges of the frame 20, as shown in FIG. 2B.

Figure 3:
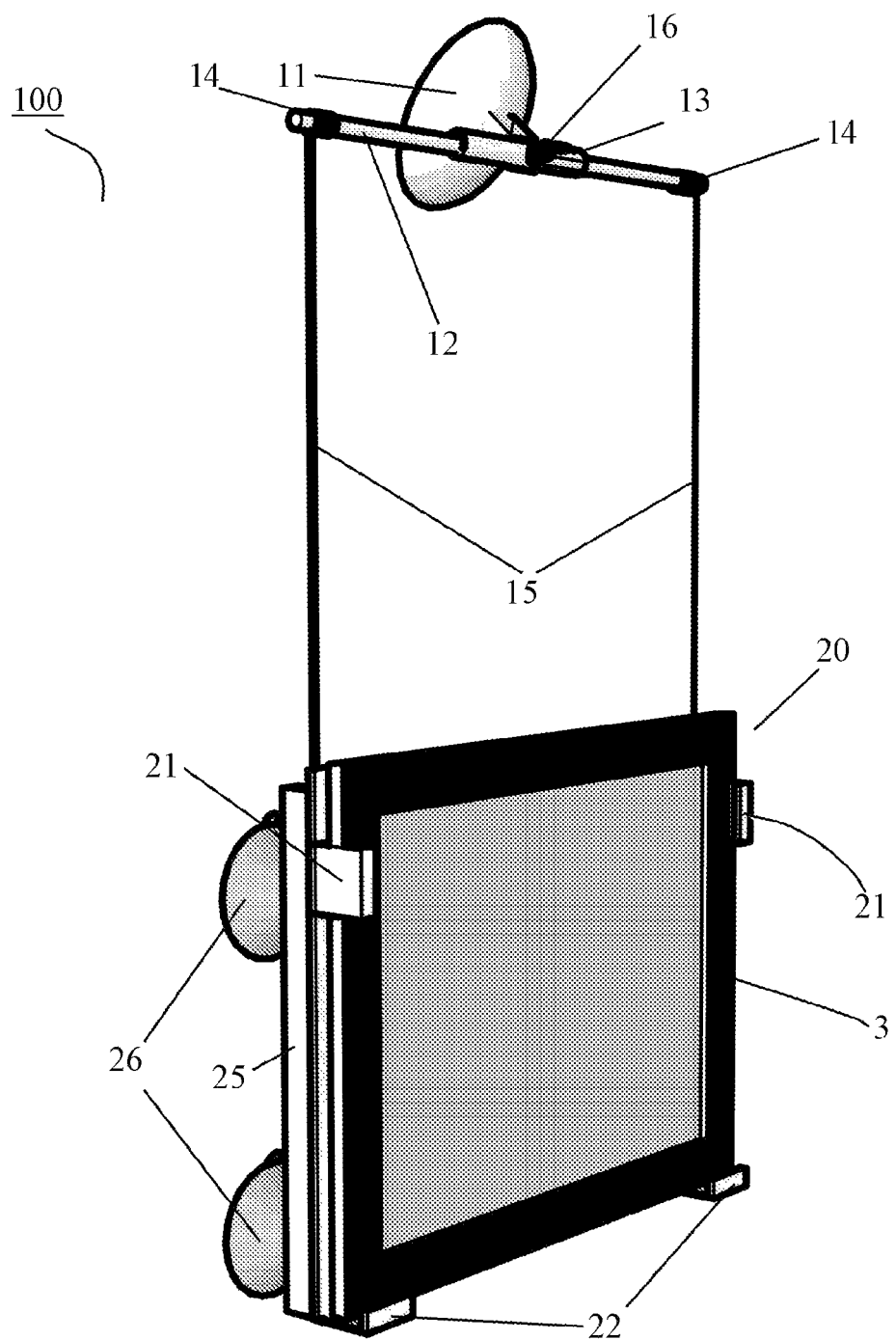
FIG. 3 is a perspective view of a preferred embodiment of the apparatus holding a tablet PC within the frame.

FIG. 3 illustrates the apparatus 100 holding a tablet PC 3 within the frame 20. A tablet PC 3 slides into position on the frame 20 when lowered into the gap between the clips of the upper clip pair 21 until the bottom edge of the tablet PC 3 comes to rest upon the clips of the lower clip pair 22. Removal of the tablet PC 3 from the frame 20 of the apparatus 100 is accomplished by simply lifting the tablet PC 3 up through the gap between the clips of the upper clip pair 21. While prior art mounting devices are defeated by the bulk and weight of tablet PCs, the present invention capitalizes on said bulk and weight to increase the security of the attachment between the tablet PC 3 and the clips of the lower clip pair 22 upon which it rests. The weight and dimensions of a typical tablet PC thus render it so firmly attached to the frame 20 of the apparatus 100 that only a complete inversion of the apparatus 100 can dislodge the tablet PC 3 from its attached position. Even this unlikely contingency can be easily corrected by the addition of further clips or fastening means at the top edge of the frame 20, as contemplated for other embodiments of the present invention.

FIG. 3 demonstrates that the tablet PC 3 may be positioned at a distance from the actual site of attachment between the mounting means 11 and some surface or object in the environment. Adjustment of the actual position of the tablet PC 3, by virtue of its confinement within the frame 20, is easily regulated by adjusting the effective length of the cordage 15. The precise emplacement of the tablet PC 3 may be further regulated by stabilizers 26 attached to the rear surface of the frame 20. Stabilizers 26 may comprise suction cup assemblies and other structures tending to achieve attachment to a surface. Stabilizers 26 may interact with the same surface to which the mounting means 11 attaches, or to different surfaces and structures in the environment. Multiple stabilizers 26 may be attached to the rear side of the frame 20 and they may be adapted for use in any general or specific location.

For example, when the apparatus 100 is mounted in an automobile and the mounting means 11 is attached to a windshield, the frame 20 holding the table PC 3 may hang suspended to a position near the lower console of the dashboard. One or more stabilizers 26 may interact with the dashboard or console of the automobile to prevent the frame 20 and tablet PC 3 from swaying, twisting or otherwise shifting position during movement of the vehicle. Various custom stabilizers 26 may be specifically manufactured for application in designated conditions or locations, such as in specific models of automobiles, for example, where they may be designed according to the particular contours of the dashboard or center console. Stabilizers 26 are intended not only to facilitate attachment, but also to adjustably control the orientation of the frame 20 and tablet PC 3 to achieve fine control over the angle and direction of emplacement during use.

Figure 4A:
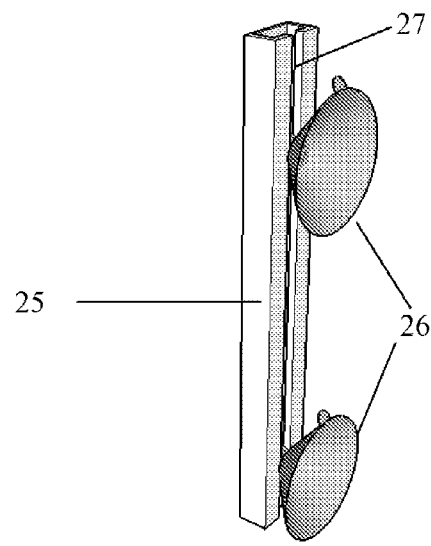
FIG. 4A is a perspective view of one example of a type of versatile stabilizer attachment means.
Figure 4B:
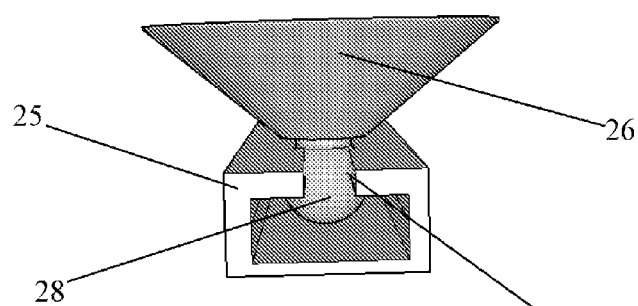
FIG. 4B is an end view of one example of a type of versatile stabilizer attachment means.

Stabilizers 26 may be swappable by virtue of a versatile stabilizer attachment means 25, such that the frame 20 of a single apparatus 100 may be equipped with different stabilizers 26 at different times according to specific needs. FIGS. 4A and 4B show a perspective view and an end view, respectively, of an example of a versatile stabilizer attachment means 25. In this embodiment, the stabilizer attachment means 25 comprises a bar having a channeled extrusion or slot 27 on a side facing away from the frame 20, wherein the slot 27 receives a knobbed end 28 of a stabilizer 26 such as a suction cup. If the apparatus 100 is moved to a locale where an adhesive or a magnet would be superior to a suction cup as a stabilizer 26, then adhesives or magnets, each having knobs 28 compatible with the slot 27 of the stabilizer attachment means 25, can be swapped in while the suction cups are swapped out by sliding said stabilizers 26 along the slot 27 until they exit the bottom of the bar. One or more instances of such a versatile stabilizer attachment means 25 may be attached to the rear surface of the frame 20, preferably one per side.

Figure 5A:
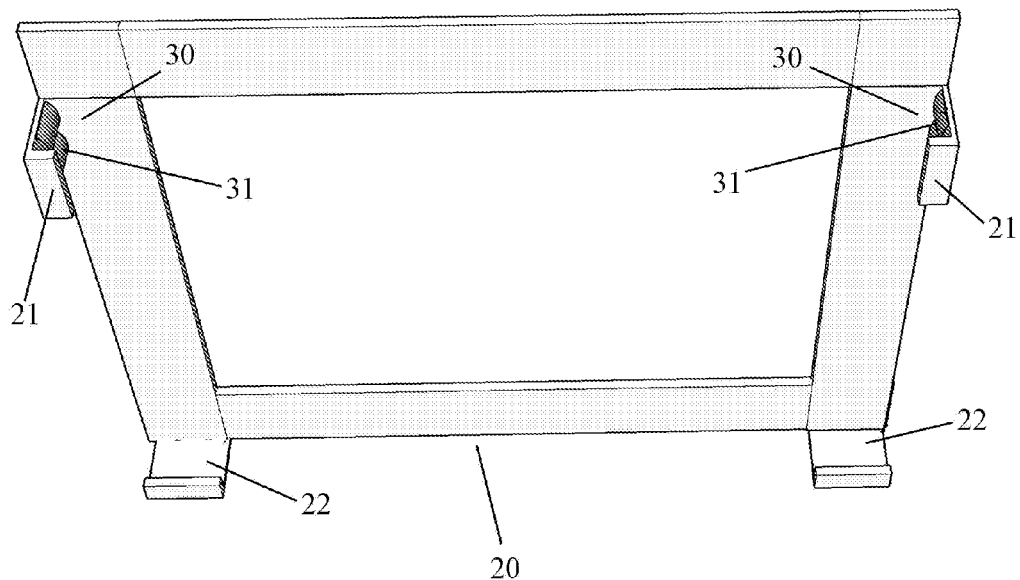
FIG. 5A is a perspective view of the frame of the apparatus illustrating a simple resilient compression means for stabilizing a tablet PC between the clips of the frame.

Further embodiments of the invention may comprise a resilient compression means 30 for gripping the lateral edges of a tablet PC when inserted into the frame 20, or for effectively increasing the pressure applied by the clips to the tablet PC 3 inside the frame 20. FIG. 5A shows two iterations of a resilient compression means 30 attached to the interior surface of each clip of clip pair 21. The resilient compression means 30 in this embodiment comprises a flexible metal band 31 attached to the inside surface of a clip. When a tablet PC is inserted into the frame 20, the outer surface of the flexible metal band 31 of the resilient compression means 30 pushes against the lateral edges of the tablet PC, thus holding it more firmly in place between the clips of clip pair 21. This arrangement can be repeated in other embodiments such as those that comprise two lateral clip pairs 21 and 23. Or, instead of a metal band, the resilient compression means 30 may be a strip of felt, a foam cushion, or other spongy material, for example.

Figure 5B:
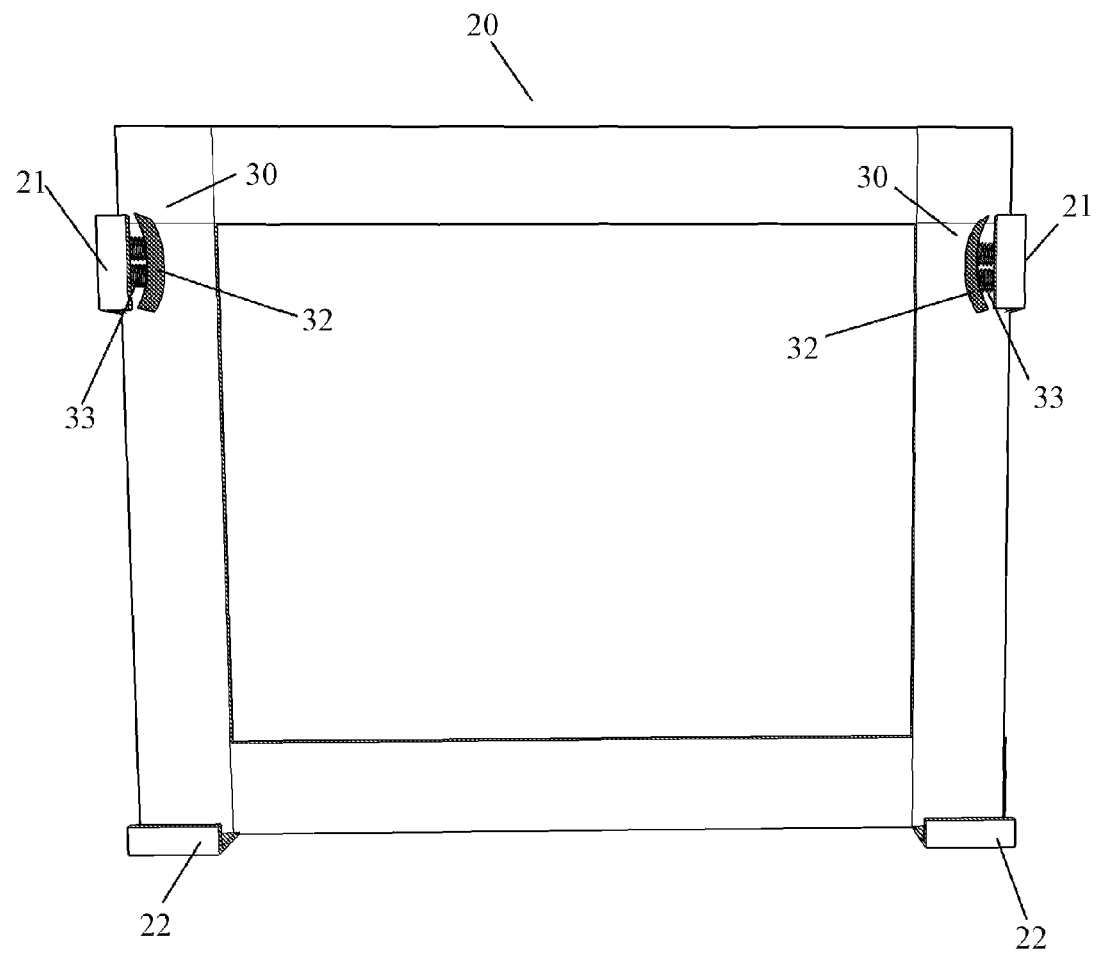
FIG. 5B is a front view of the frame of the apparatus illustrating a complex resilient compression means for stabilizing a tablet PC between the clips of the frame.

A more elaborate resilient compression means 30 may comprise a platform 32 supported by springs 33 as shown in FIG. 5B. The platform 32 is depressed by the lateral edges of a tablet PC 3 as it is inserted into the frame 20 between the clip pair 21, said platform 32 being pushed against the resistance in the springs 33 which extend transversely from the interior surface of the clips of the clip pair 21.

Alternative Configurations for Adjusting Length of Cordage

Figure 6:
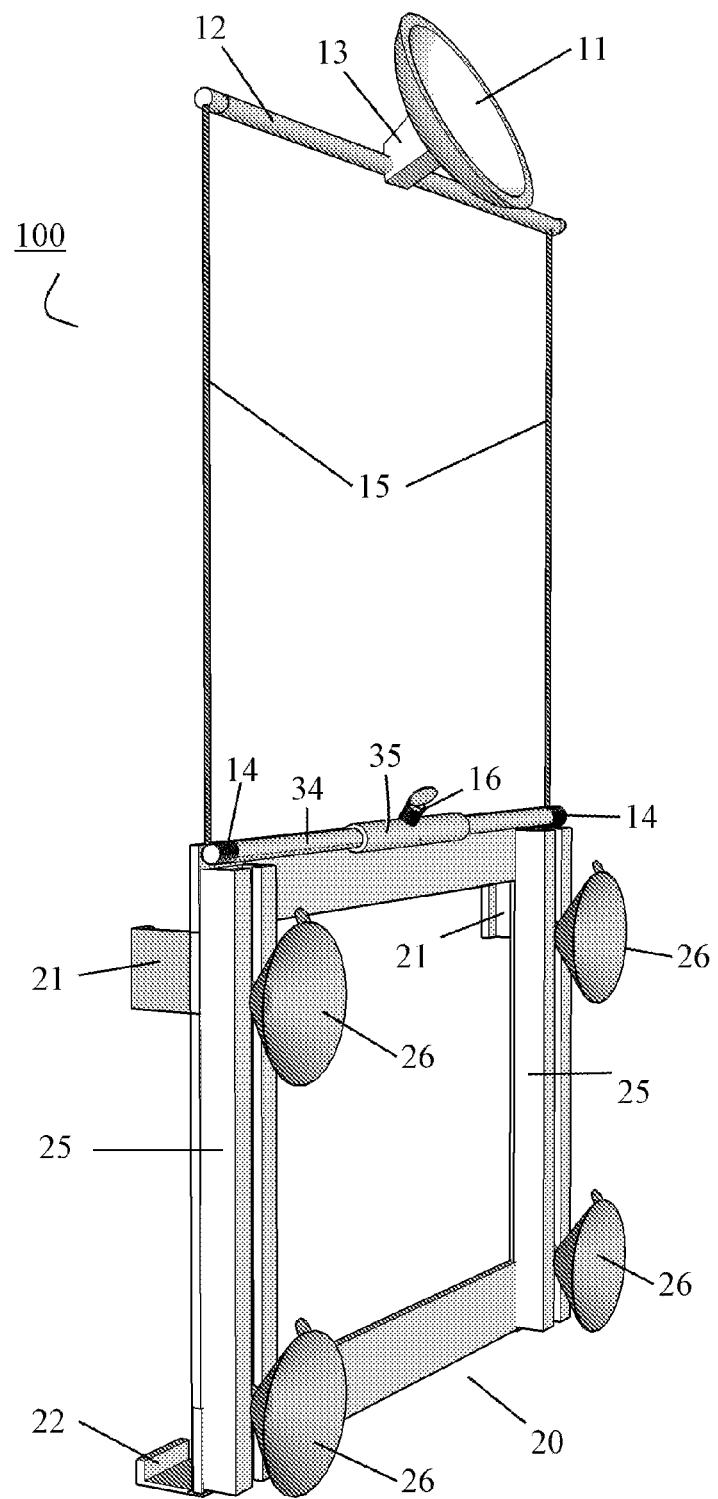
FIG. 6 is a rear perspective view of a second preferred embodiment of the apparatus having an adjustment means attached to the frame rather than at the mounting means.

FIG. 6 shows an alternative configuration for the apparatus 100, in which the adjustment means 14 is attached at the frame 20 instead of at the mounting means 11. Another way to describe this alternative arrangement is to say that the adjustment means 14 is attached to the opposite ends of the cordage 15 as compared to the arrangement depicted in the embodiment of FIG. 1. In FIG. 6, the hanger 12 remains attached to the connector element 13 in proximity to the mounting means 11, however, the hanger 12 is not rotatable. The cordage 15 extends from one end downwards from the hanger 12 and attaches at its opposite end to the adjustment means 14. The adjustment means 14 may comprise the end portions of a second horizontal rod 34 similar to the structure previously described as the hanger in the embodiment of FIG. 1. Said second horizontal rod 34 is attached to the frame 20 by a connector element 35 that has a thumbscrew as a tensioning element 16. Adjustment of the effective length of the cordage 15 for adjusting the position of the frame 20 relative to the position of the mounting means 11 is achieved as described for the embodiment of FIG. 1.

Figure 7:
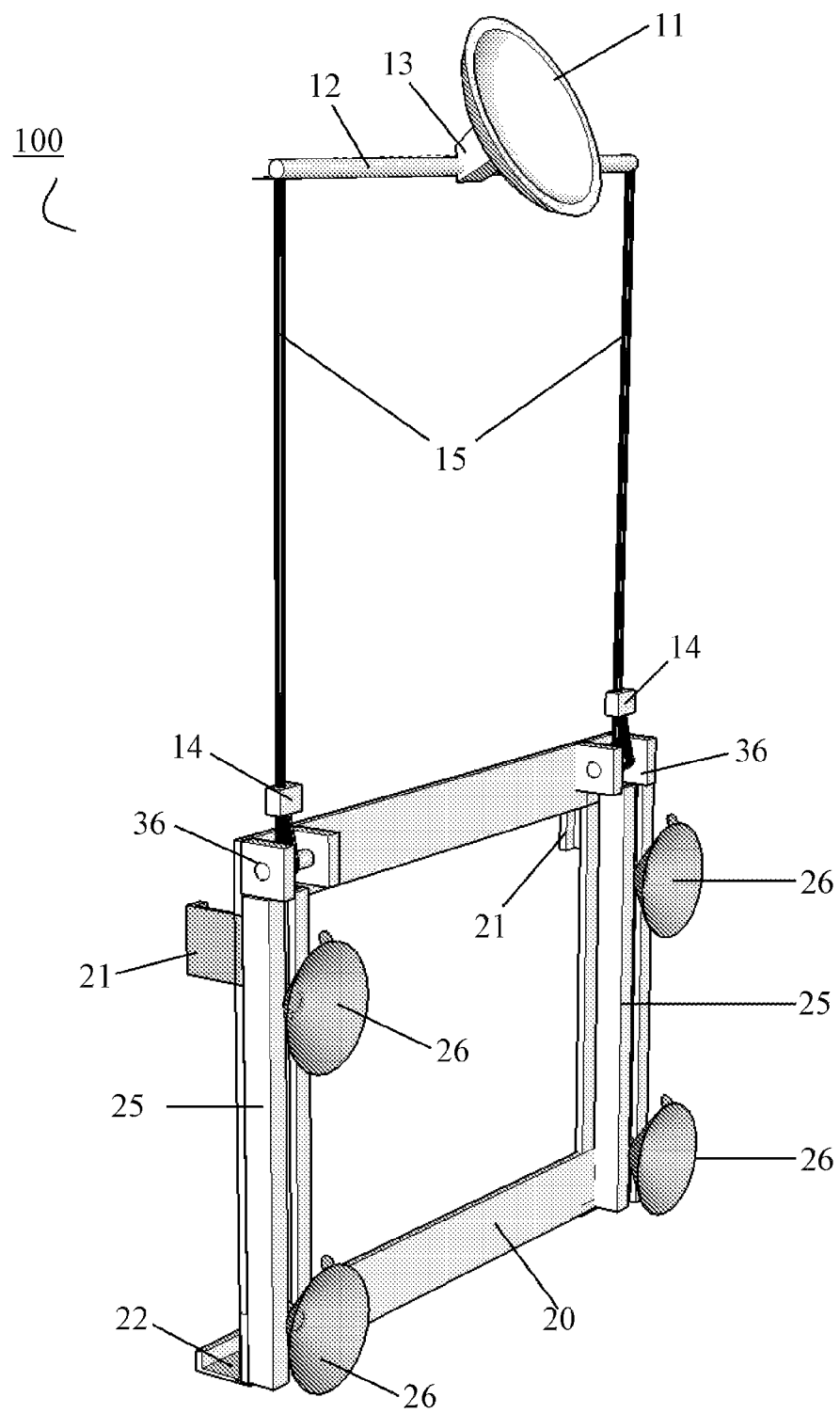
FIG. 7 is a rear perspective view of a third embodiment of the apparatus wherein the adjustment means is a cord clamp.

In another alternative configuration, illustrated in FIG. 7, the adjustment means 14 is a clamp, a barrel nut, a re-closable fastener, a buckle or similar strap adjustment assembly, or any other means for controlling the length of a looped cord or strap. The cordage 15 is attached to the hanger 12 fastened to the mounting means 11, and as the cordage 15 descends to the frame 20, it loops around a ring, pulley, peg or similar loop attachment element 36 on the frame 20, whereupon it extends upwards again to join with the adjustment means 14, which is manually positioned by the user of the invention at a desired location between the frame 20 and the hanger 12. The user may slide or move the adjustment means 14 higher or lower to adjust the effective length of the cordage 15, thereby adjusting the position of the frame 20 relative to the position of the mounting means 11.

Using the Invention to Mount a Tablet PC within an Automobile

Figure 8:
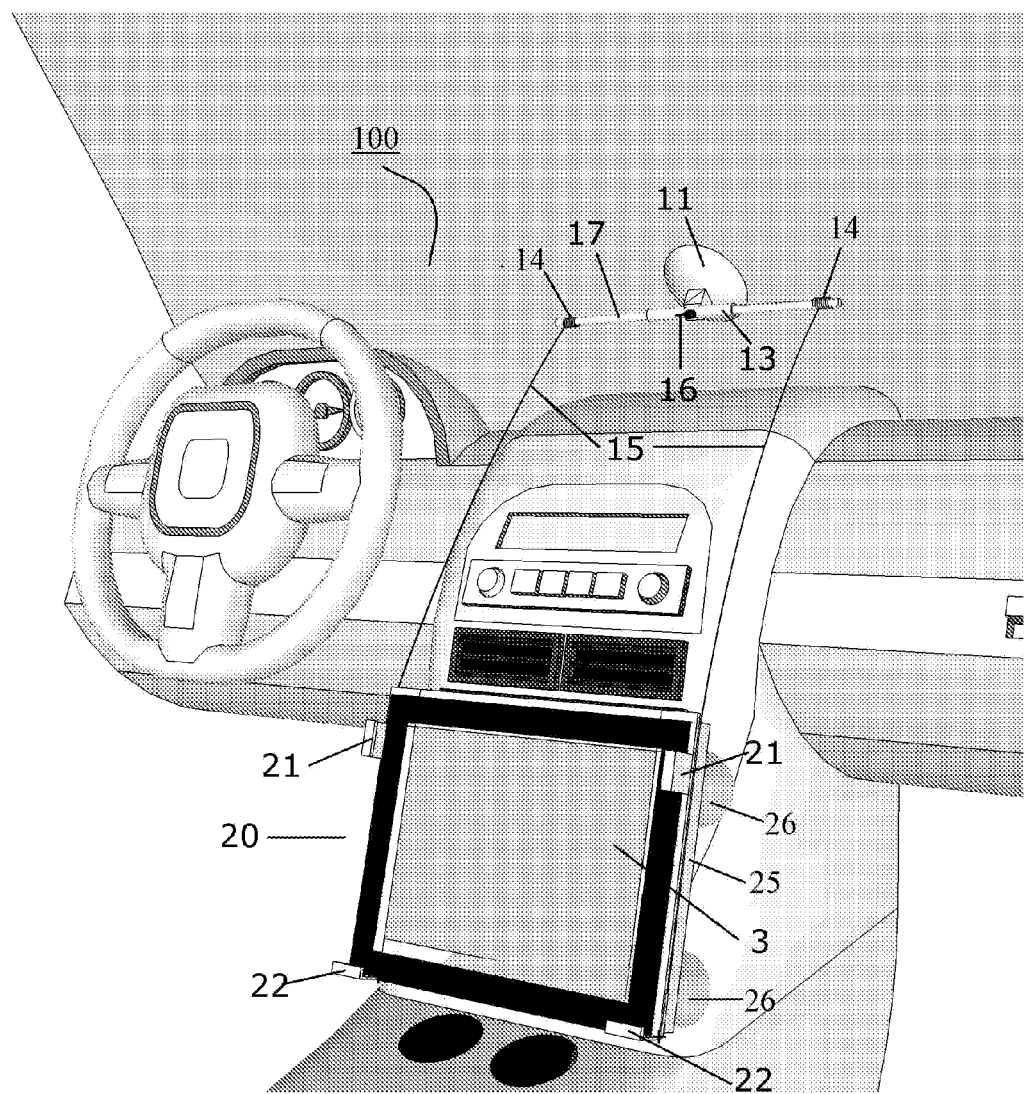
FIG. 8 is a perspective view of the invention being used to mount a tablet PC in the front compartment of an automobile.
Figure 9:
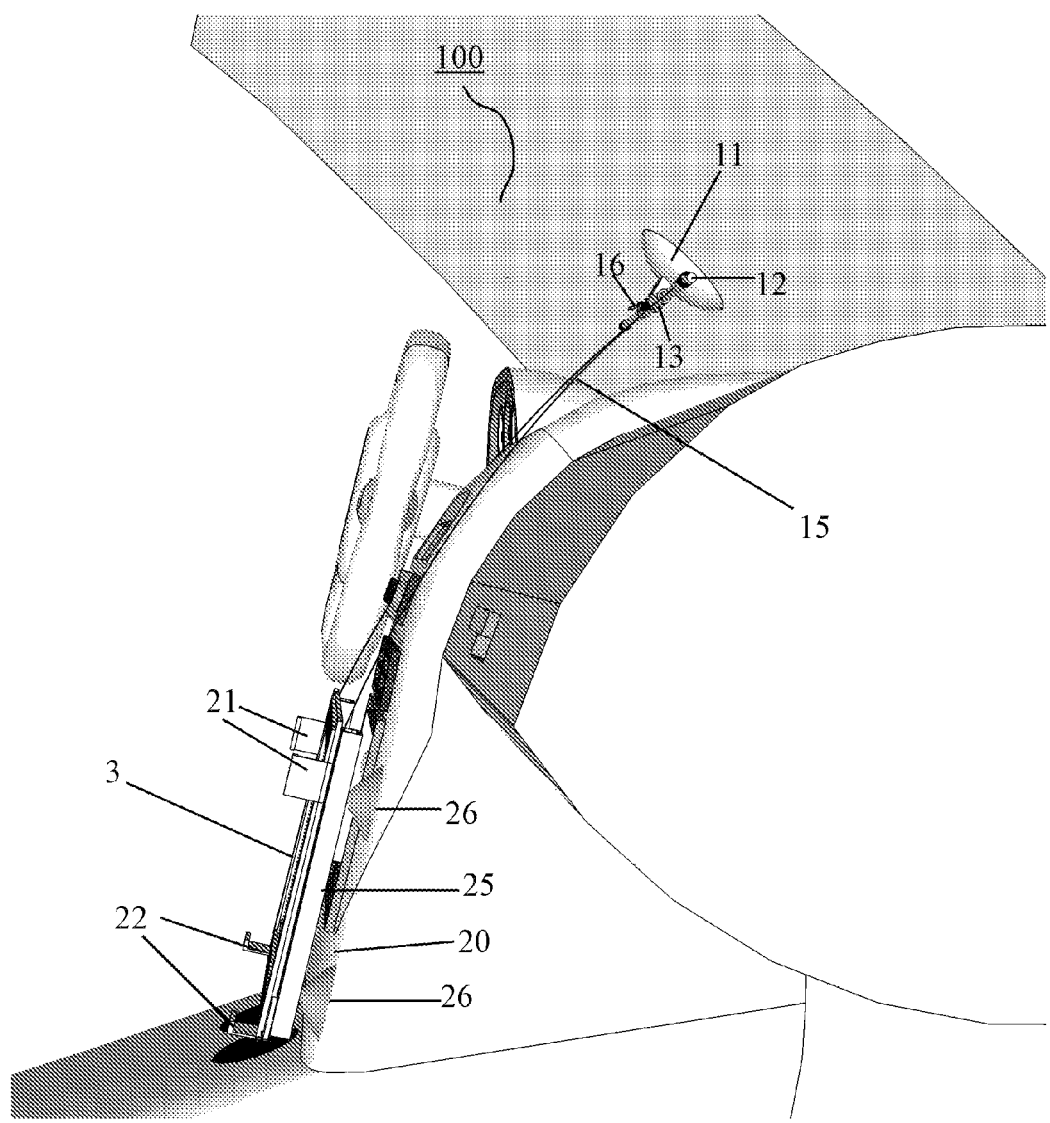
FIG. 9 is a side view of the invention being used to mount a tablet PC in the front compartment of an automobile.

FIG. 8 illustrates a perspective view of the apparatus 100 of the present invention holding a tablet PC 3 in the frame 20 while the mounting means 11 is attached to the interior surface of a windshield in an automobile. The adjustment means 14 is adjusted so that the frame 20 is situated at an appropriate location adjacent to the center console of the lower dashboard. The stabilizers 26 contact the lower part of the dashboard to hold the frame 20 in a stationary position and prevent lateral swinging. The contact between the stabilizers 26 and the lower dashboard is particularly apparent in FIG. 9, which is a side view of the apparatus 100 of the present invention holding a tablet PC 3 in the frame 20 while the mounting means 11 is attached to the interior surface of a windshield in an automobile.

Figure 10:
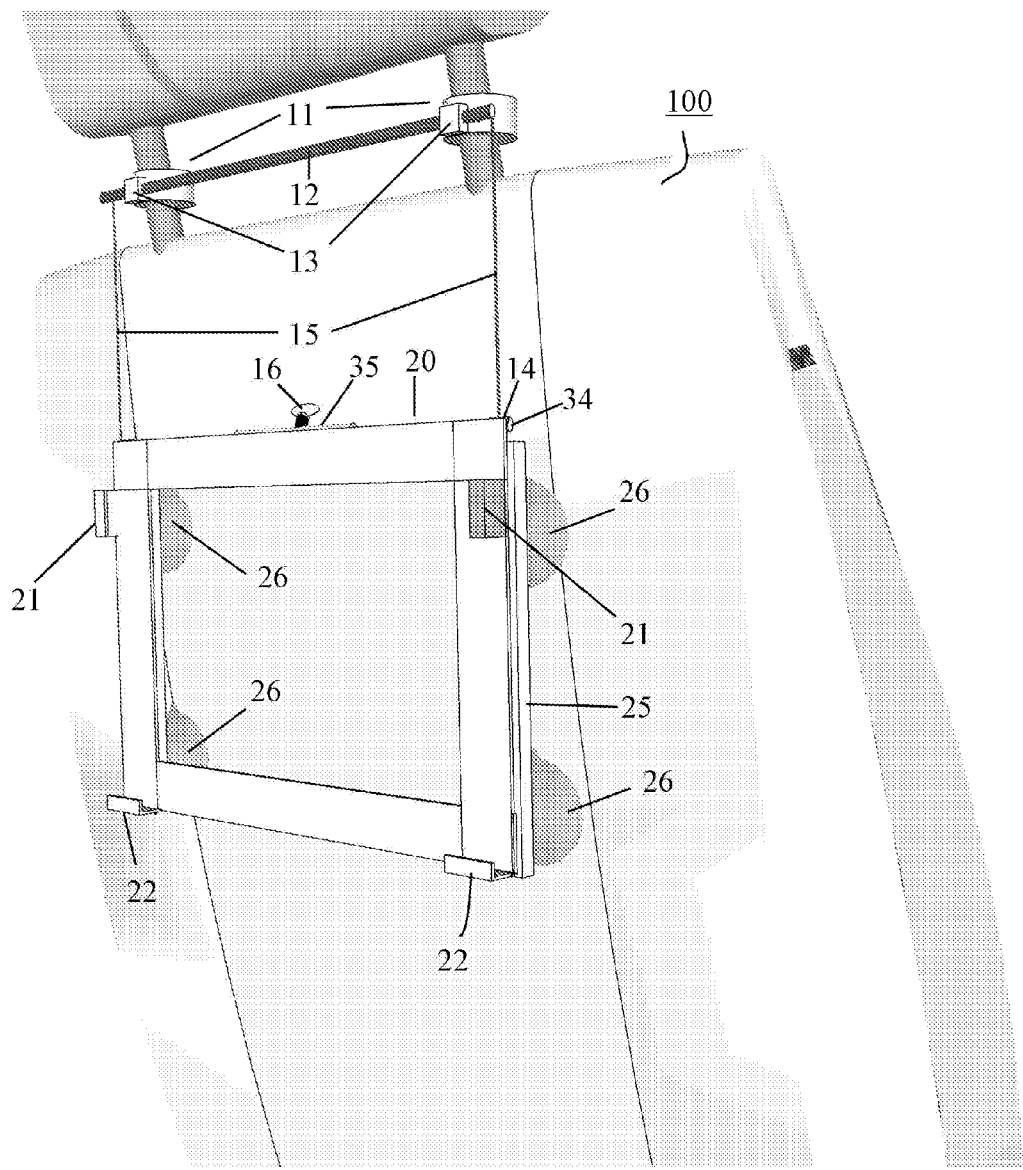
FIG. 10 is a perspective view of the invention mounted on the back of a car seat.

FIG. 10 is a perspective view of the apparatus 100 mounted on the back of a car seat to be conveniently operable by a passenger behind the seat. The mounting means 11 comprises a pair of clasps attached to the two arms that support a headrest above the seat. The mounting means 11 is attached to the hanger 12 by a connector element 13, and the cordage 15 extends downwards from the hanger 12 to the frame 20. The frame 20 hangs at a position behind the seat back and is attached thereto by stabilizers 26. The stabilizers 26 are independently adjustable spacers, and the orientation of the frame 20 is maintained in a vertical plane despite the tilt of the seat, because the bottom spacers extend slightly farther than the top spacers from the rear surface of the frame 20.

Frame Size Variability

Tablet PCs range in sizes from approximately 5 (five) inches to approximately 10 (ten) inches in width, and between 3 (three) and 10 (ten) inches in height. The present invention accommodates size variability in several ways. First, the resilient compression means 30 may occupy any gap between the lateral edges of a tablet PC and the confining clips when said gap is less than approximately one inch wide. Alternative embodiments utilize an adjustable frame 20 in which each side of the frame 20 may slide relative to the other sides of the frame 20, as depicted, for example, in FIG. 11 and FIG. 12.

Figure 11:
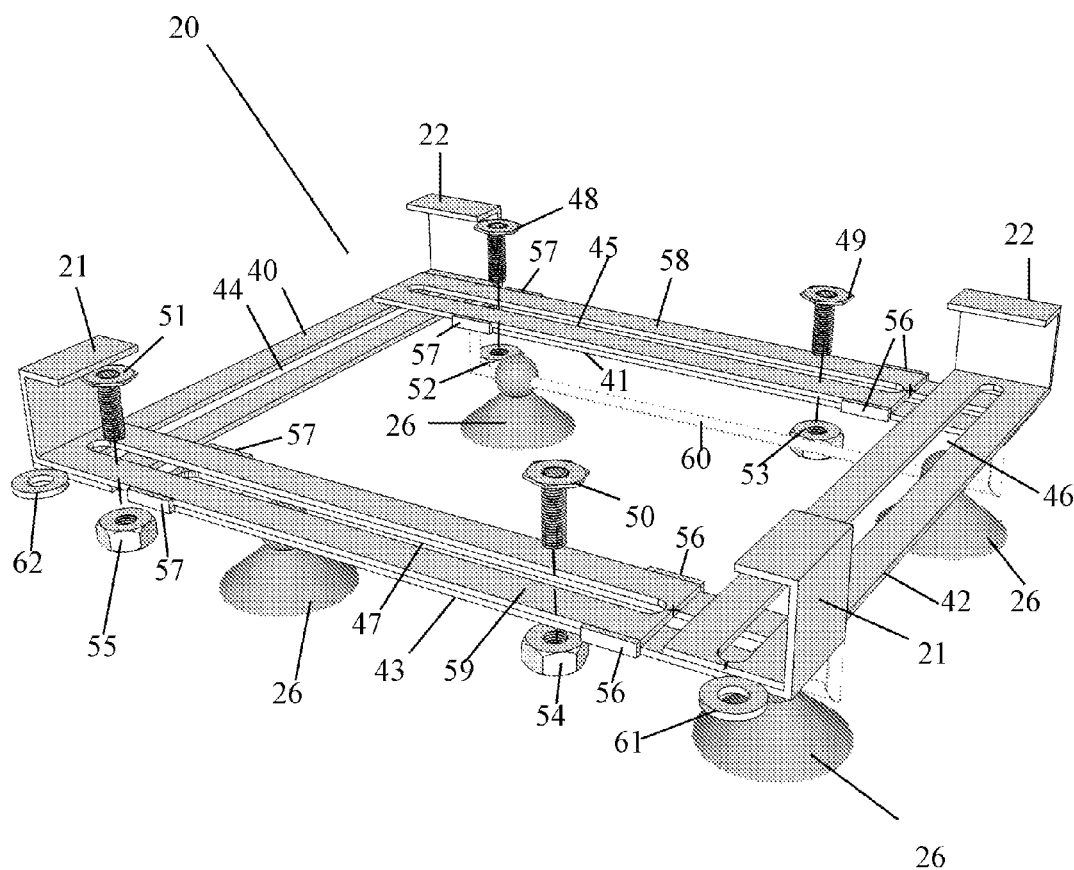
FIG. 11 is a front perspective view of a fourth embodiment of the invention having adjustable frame dimensions.

FIG. 11 shows a perspective view of a front surface of the apparatus 100 having a frame 20 with adjustable dimensions. Adjustability of frame dimensions in this embodiment is achieved by constructing the edges of the frame from slats 40, 41, 42, 43 with a central groove 44, 45, 46, 47 in each, wherein said central groove receives the threaded portion of a bolt, peg, or similar fastening means 48, 49, 50, 51. Said bolts have a flat surface and may be fastened to their respective slat by a nut 52, 53, 54, 55. One or more of the slats 41 and 43 may comprise two adjacent members sandwiched together by one or more guide elements 56 and 57, so that a second slat 58 and 59 is positioned above the first slat 41 and 43, respectively. The sandwiched slats, 41 and 58 on the one side, and 43 and 59 on the opposite side, slide over one another between the edges of the guide elements, 56 and 57, respectively. Extension of the sliding slats 41, 43, 58, 59 extends the length of the respective side of the frame 20, and retraction of said sliding members contracts the length of the respective side of the frame 20. Although not shown in FIG. 11, the other two sides of the frame 20 may also or alternatively comprise sliding slats. Clip pairs 21 and 22 are also shown extending from the front surface of the frame 20.

Figure 12:
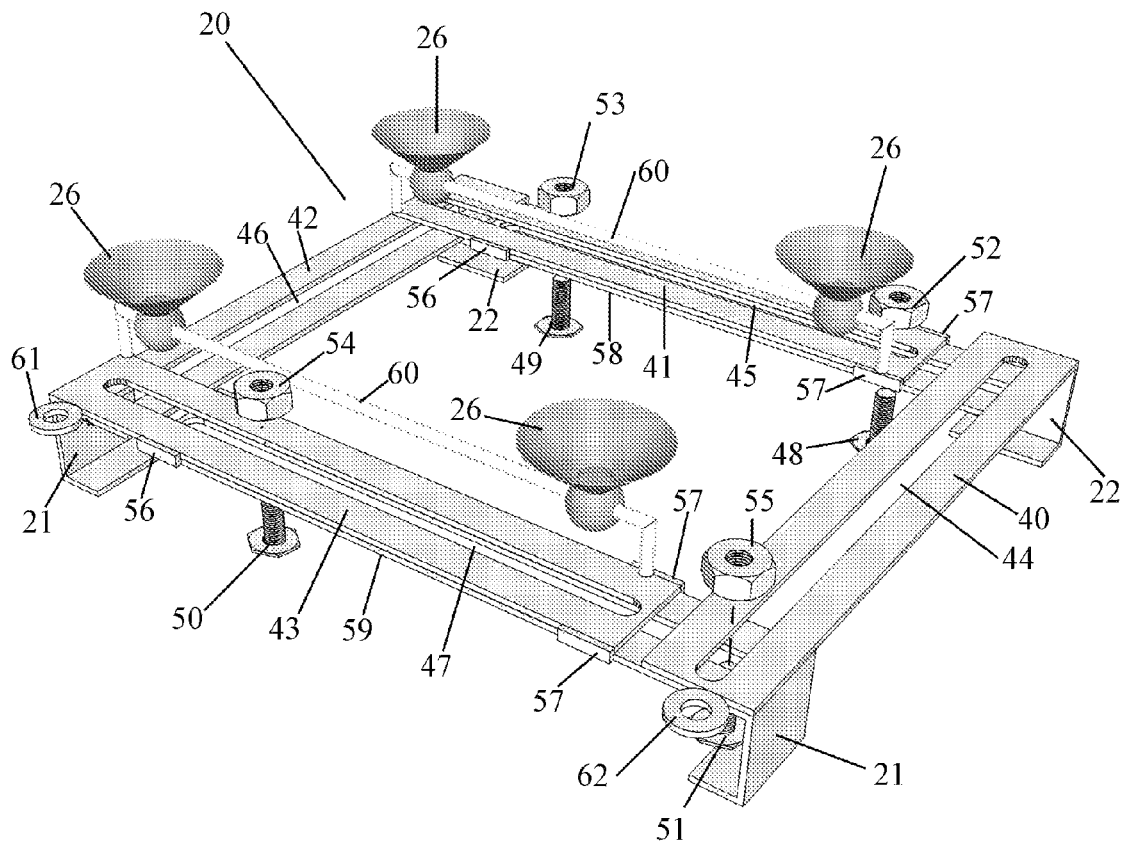
FIG. 12 is a rear perspective view of the fourth embodiment of the invention having adjustable frame dimensions.

FIG. 12 is a perspective view of the rear surface of the apparatus 100 having the frame 20 with adjustable dimensions. Any of the slats 40, 41, 42, 43 may be constructed such that they are continuous with any of the clips, such as the clips of clip pairs 21 and 22. Both FIG. 11 and FIG. 12 depict four stabilizers 26, which in this embodiment are suction cup assemblies comprising a rod 60 attached to the slats 41 and 43 of the frame 20. Two rings 61 and 62 serve as attachment points for the cordage 15 and may be construed as equivalent to the loop attachment elements 36 of the embodiment shown in FIG. 7, above.

Figure 13:
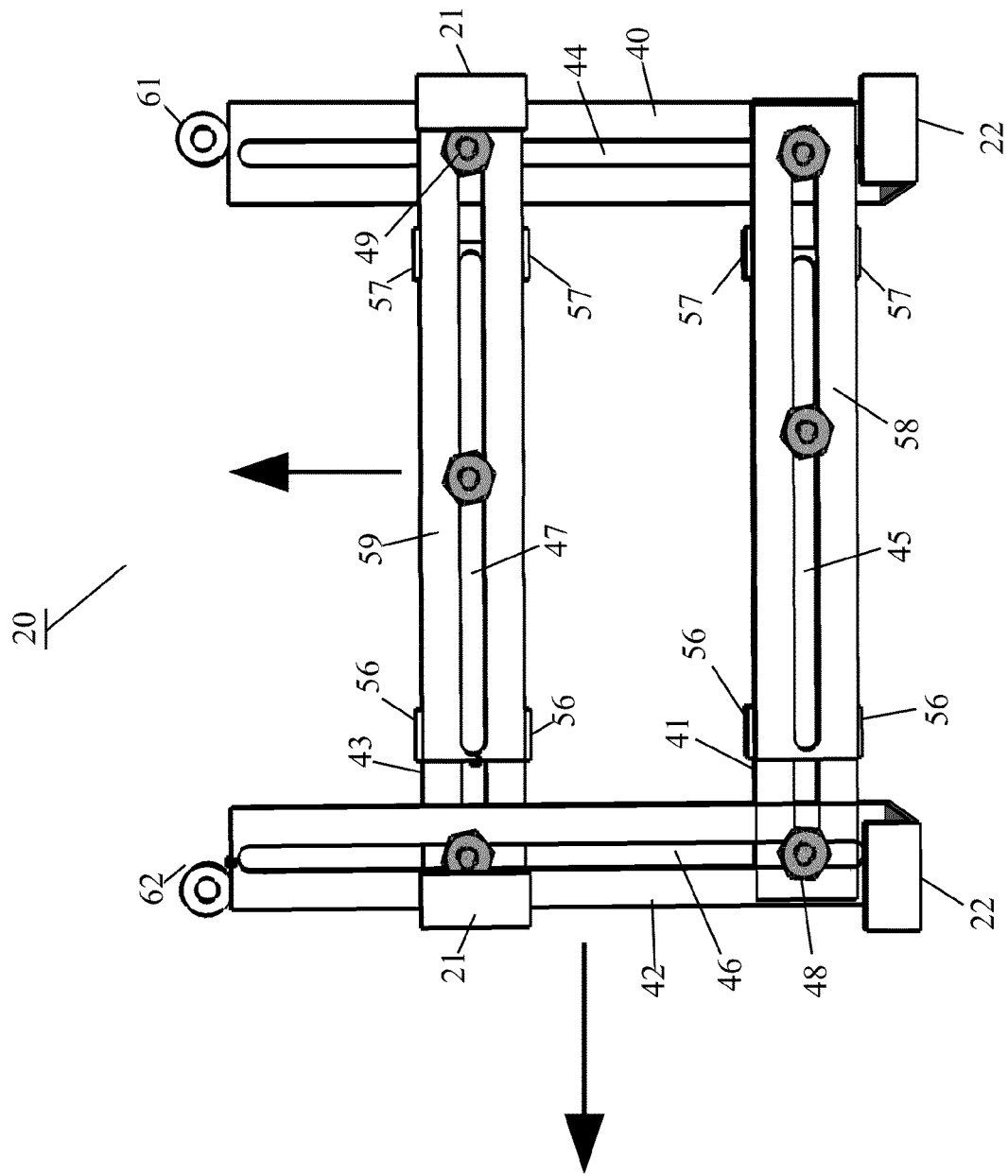
FIG. 13 is a top view of the frame showing the movement of slats during adjustment of the horizontal length and vertical height of the frame, where the frame size is being increased by moving the slats outwards from the center of the frame.

FIG. 13 illustrates how the sides of the frame 20 can be moved relative to each other to adjust the horizontal length and vertical height of the frame in a manner that enlarges the dimensions of the frame during use. The movement of the sides is accomplished without disassembling the frame 20; retaining bolts or their corresponding nuts (e.g., 48, 49), which pass through grooves (e.g., 44, 45, 46, 47) in the slats (e.g., 40, 41, 42, 43) that comprise the sides of the frame 20, are loosened slightly to permit the slat members to slide relative to each other, and then said bolts are re-tightened when the dimensions are established to the satisfaction of the user. The frame 20 would be attached to the cordage 15 (not shown) at eye-rings 61 and 62, for example. The slats are guided and positioned as they slide relative to each other via guides (e.g., 56 and 57). The "top side" of the frame 20, for example, would be considered as comprising slats 43 and 59. The large shaded arrow pointing upwards in the drawing represents motion of the top side of the frame 20 in the vertical direction. The large black arrow pointing leftwards represents motion of the left side of the frame 20 in the horizontal direction. The left side in this example comprises slat 42. Notice how the clips of the clip pairs 21 (horizontal clip pairs) and 22 (vertical clips), being attached to the various sides of the frame, are effectively moved away from each other as the frame expands, thus enabling the frame to accommodate a larger tablet PC or other device inside of it in a finely adjustable and continuously adjustable manner.

Figure 14:
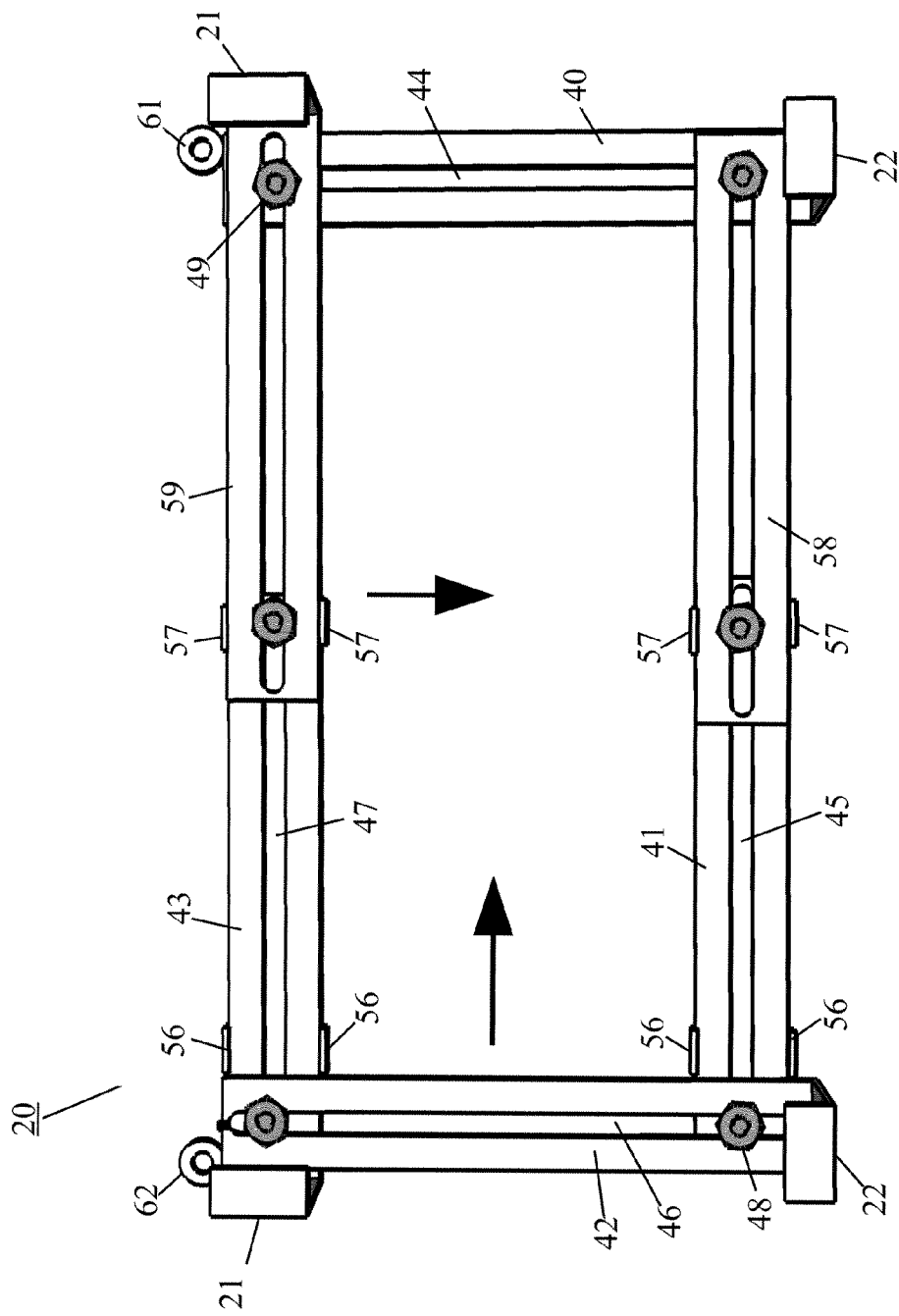
FIG. 14 is a second top view of the frame showing the movement of slats during adjustment of the horizontal length and vertical height of the frame, where the frame size is being reduced by moving the slats inwards towards the centerpoint of the frame.

FIG. 14 illustrates how the sides of the frame 20 can be moved relative to each other to adjust the horizontal length and vertical height of the frame in a manner that reduces the dimensions of the frame during use. The movement of the sides is accomplished as described for FIG. 13. The "top side" of the frame 20 in this example, as in the previous example, comprises slats 43 and 59. The large shaded arrow pointing downwards in FIG. 14 represents motion of the top side of the frame 20 in the vertical direction. The large shaded arrow pointing rightwards represents motion of the left side of the frame 20 in the horizontal direction. Notice how the clips of the clip pairs 21 and 22, being attached to the various sides of the frame, are effectively moved towards each other as the sides are contracted, thus enabling the frame 20 to snugly accommodate a smaller tablet PC or other device inside of it in a finely adjustable and continuously adjustable manner.

Any of the various embodiments shown herein may borrow from any of the others, such that any of the various mounting means 11, adjustment means 14, types of cordage 15, arrangement of clip pairs 21, 22, 23, or 24, and methods for adjusting dimensions of the frame 20, for example, may be combined within any one embodiment of the apparatus 100. Although one specific example of an adjustable frame 20 is illustrated in the drawings herein, any of the methods known in the art for constructing an adjustable four-sided frame are contemplated for use in the present invention.

Subcombinations Comprising Integrated Mounting and Adjusting Means

Figure 19A:
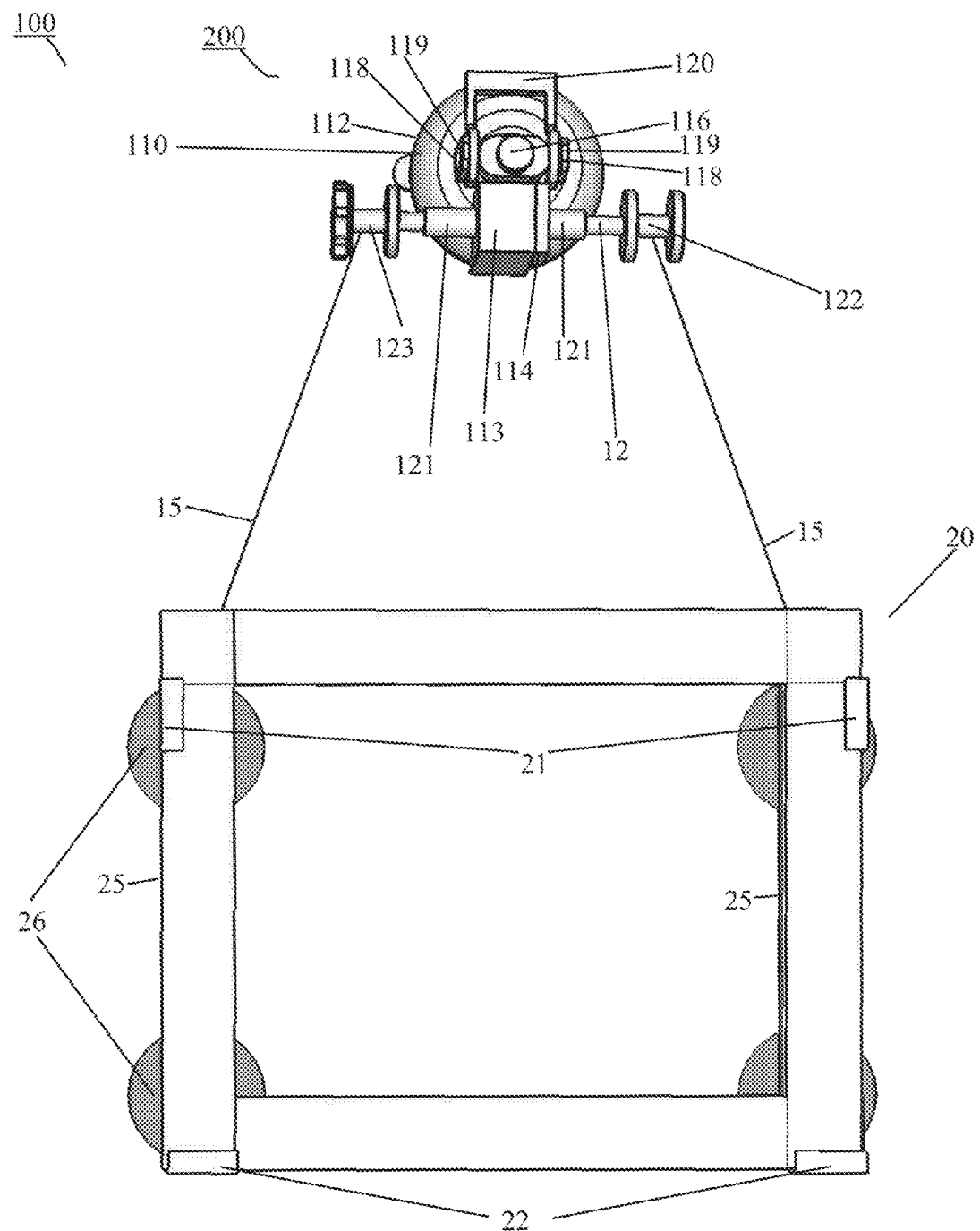
FIG. 19A is a front perspective view of a fifth preferred embodiment of the tablet PC mounting apparatus including the mounting and adjusting subcombination apparatus attached by its suction cup to a surface in the environment and with the lever closed.
Figure 19B:
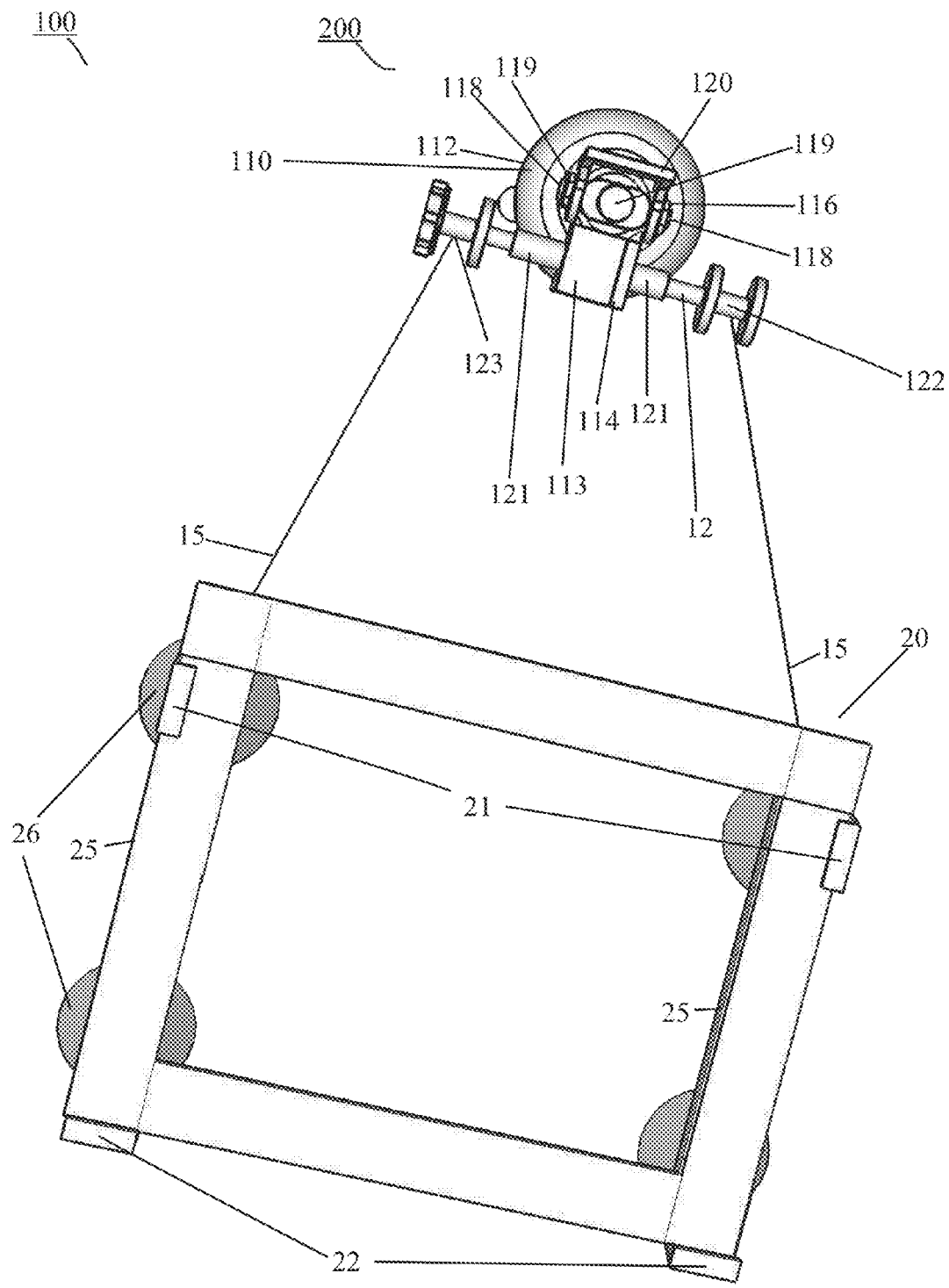
FIG. 19B is a front perspective view of the fifth preferred embodiment of the tablet PC mounting apparatus including the mounting and adjusting subcombination apparatus attached by its suction cup to a surface in the environment, said subcombination apparatus having the lever open and having been rotated clockwise around the dowel by about fifteen degrees.
Figure 20:
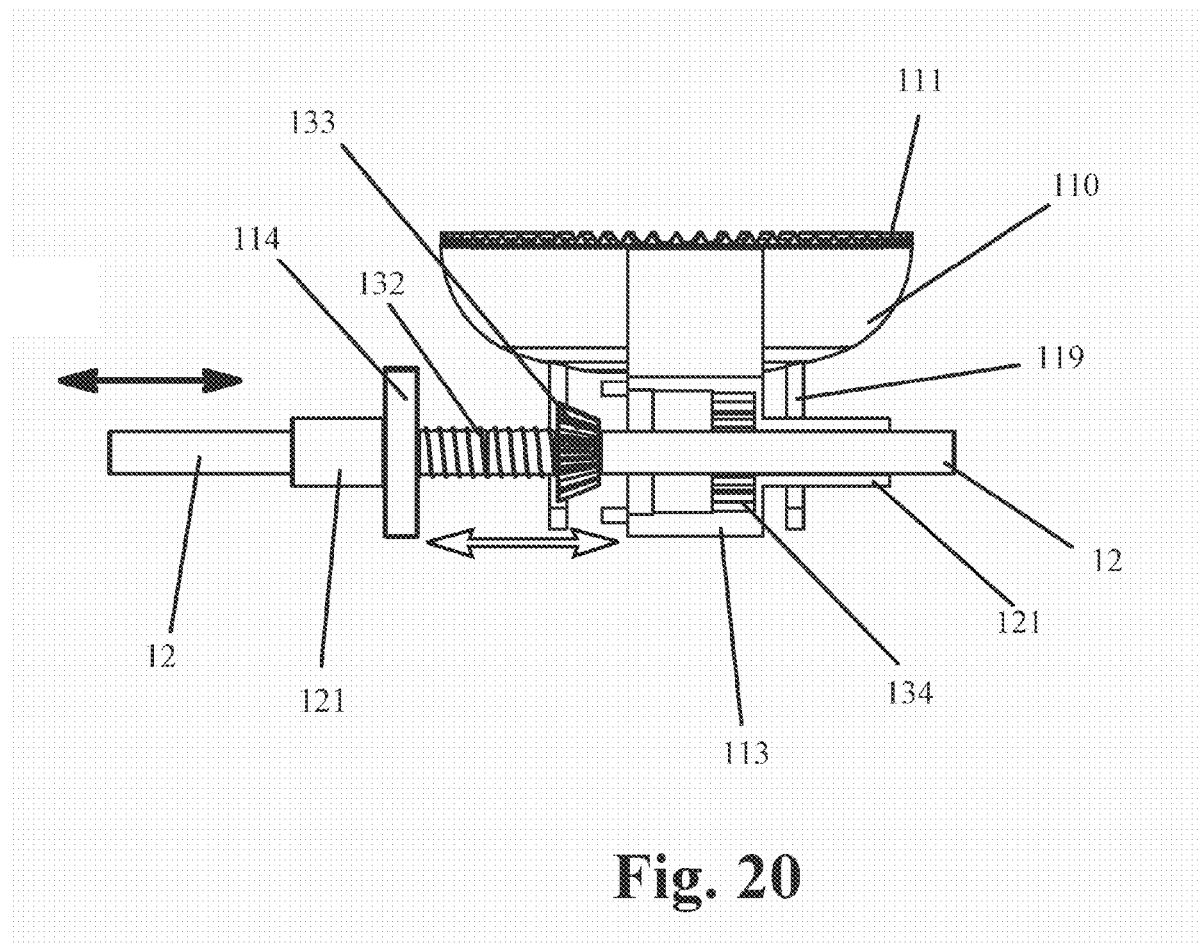
FIG. 20 is a plan view, inverted vertically, of the rear side of the preferred embodiment of the mounting and adjusting subcombination apparatus illustrating the inner components of the shaft-locking means for alternatively preventing and allowing rotation of the rod (suction cup and dowel, inter alia, omitted).
Figure 21:
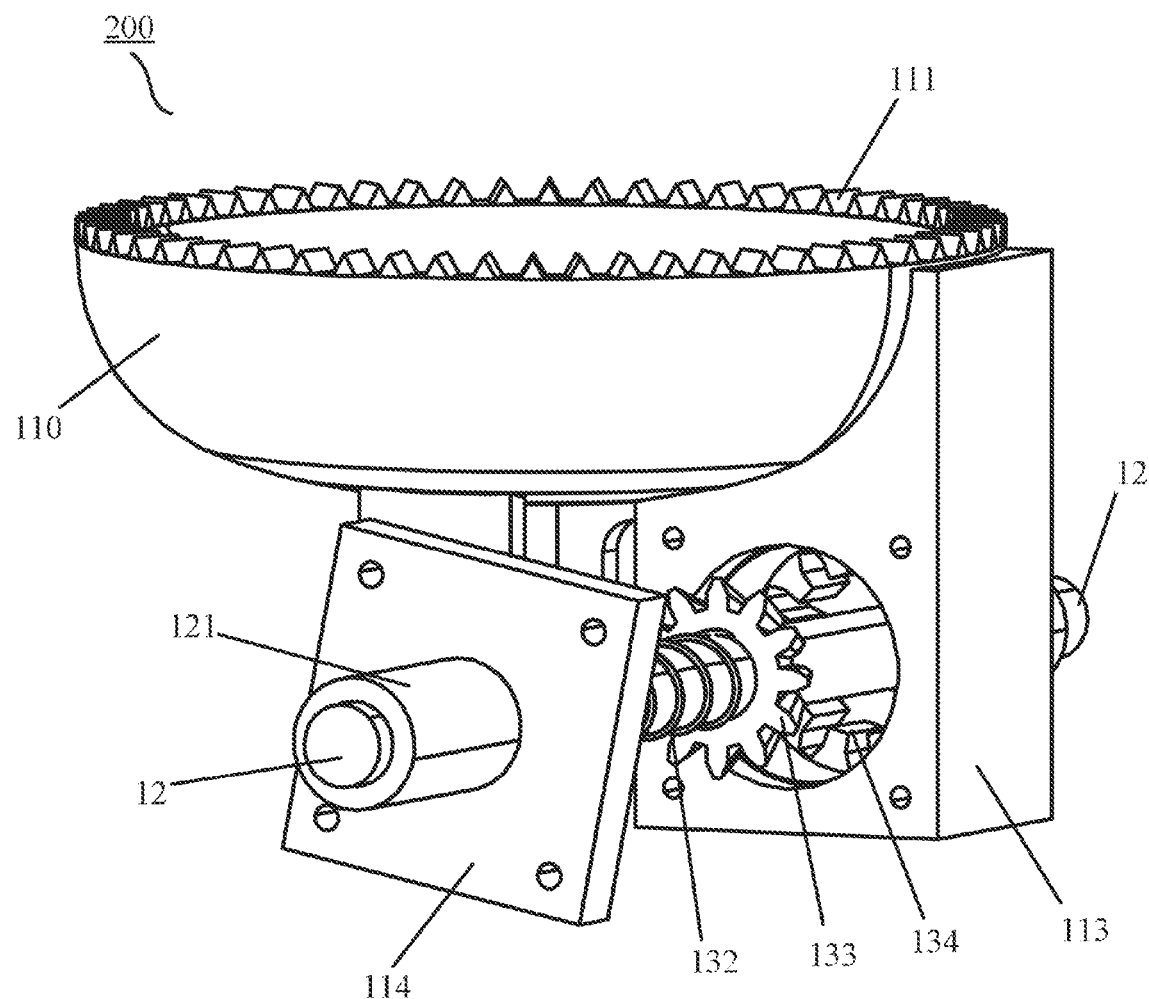
FIG. 21 is a partial section view of the shaft-locking means.

As stated above, the mounting means 11 is connected to a hanger 12, either directly or via a connector element 13. The present invention achieves enhanced portability, ease of use, versatility, and other various advantages in that it allows for the inclusion of a subcombination apparatus comprising an integrated mounting means 11, hanger 12, and tensioning element 16, wherein said mounting means comprises, broadly, a suction cup assembly (110-112; FIGS. 15, 17-19B), said hanger comprises a rotatable rod 12 having spools 122 and 123 as adjustment means 14, and said tensioning element 16 comprises a shaft-locking means (132-134; FIGS. 20, 21) for preventing rotation of the rod 12. For lexicographical purposes, said subcombination apparatus shall be referred to herein as "a mounting and adjusting subcombination apparatus" 200 or simply the "subcombination apparatus" 200.

Figure 15:
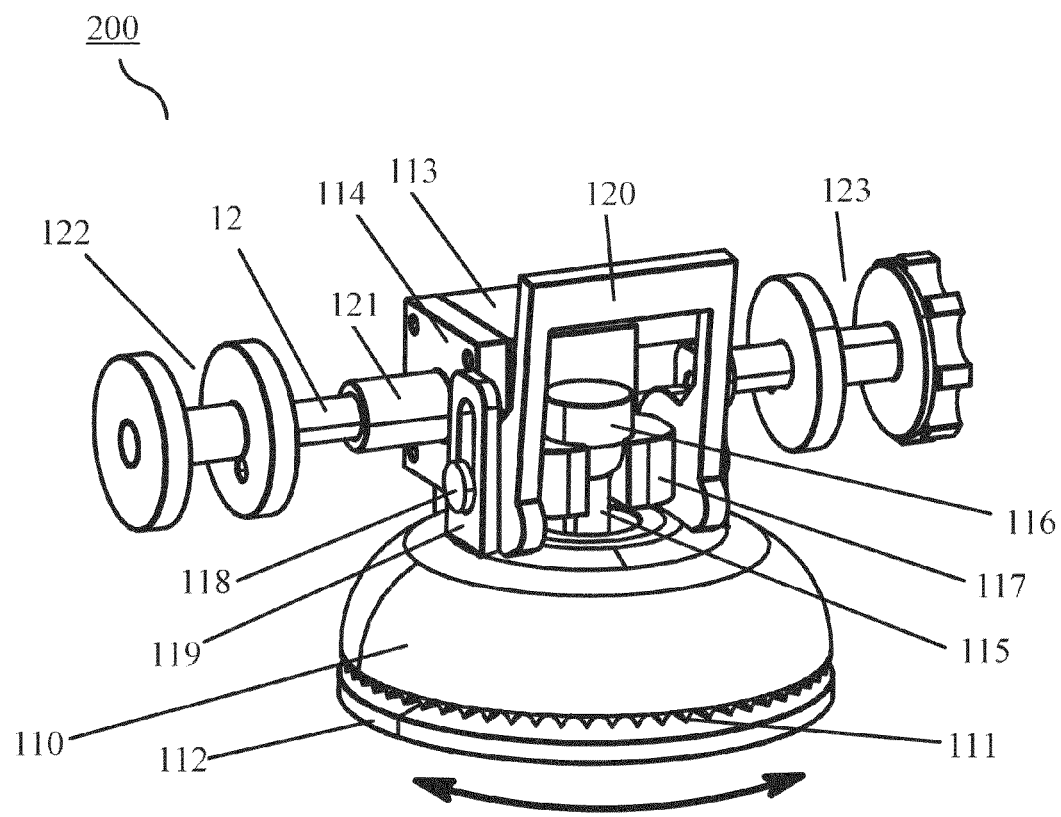
FIG. 15 is a front perspective view of a preferred embodiment of a mounting and adjusting subcombination apparatus comprising an integrated mounting means, hanger, and tensioning element.
Figure 16:
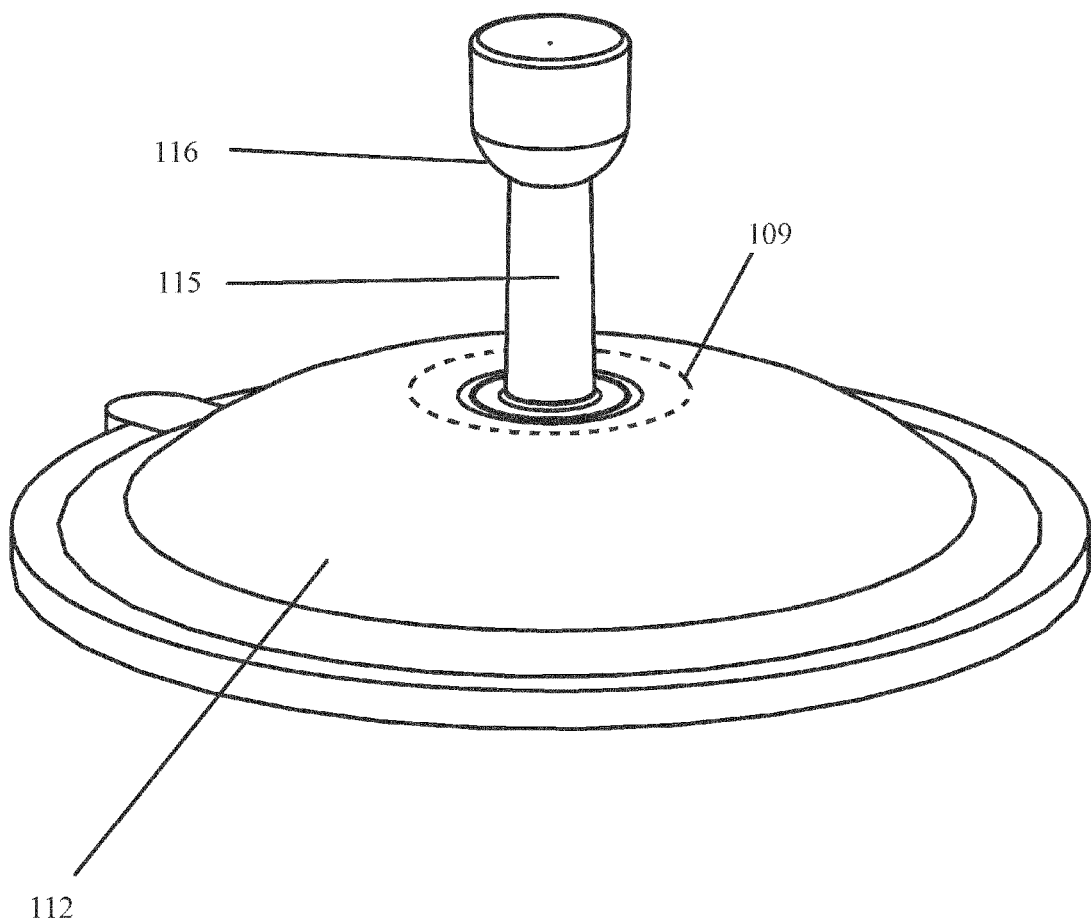
FIG. 16 is a front perspective view of a subpart of the subcombination apparatus, said subpart comprising a dowel having a terminal knob at its proximal end and being attached to a suction cup at its distal end.
Figure 17:
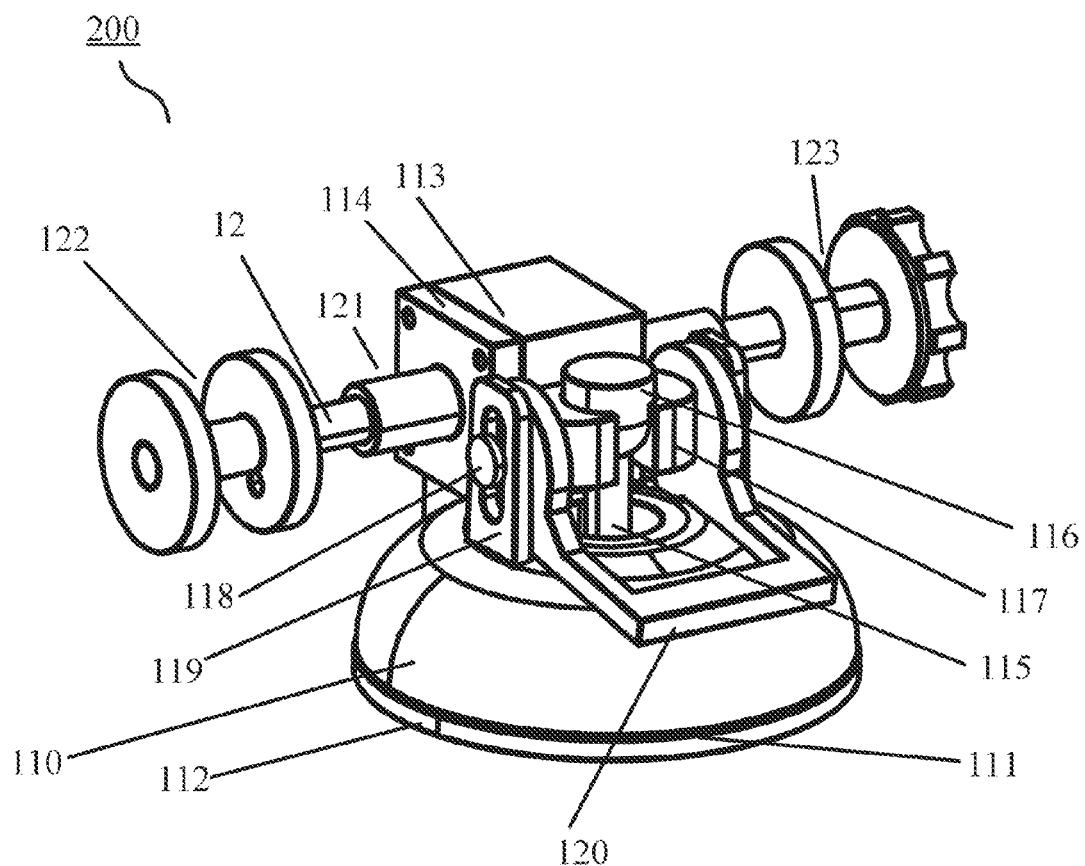
FIG. 17 is a front perspective view of the preferred embodiment of the mounting and adjusting subcombination apparatus depicting the lever in a closed position such that the dome having teeth impinges on the suction cup.

A front perspective view of a preferred embodiment of such a mounting and adjusting subcombination apparatus 200 is depicted in FIGS. 15 and 17. A central portion of the rod 12 is housed in a block 113 that is fixedly attached to a shell-like dome 110, where each of these pieces is preferably manufactured of a durable rigid material like plastic, such as from a mold or a 3-dimensional printer. In this arrangement, the block 113 may be considered a de facto connector element 13. The dome 110 has an aperture in its center through which passes a push-rod or dowel 115, said dowel 115 comprising a cylindrical body made of any rigid material (e.g., plastic, metal) having a knob, flathead, or other enlarged structure ("terminal knob") 116 at its proximal terminus and being attached to a suction cup 112 at its distal terminus such that said suction cup 112 protrudes from the distal or concave side of the dome 110. These orienting labels are chosen to simplify this description, where "proximal" means towards or above the convex side of the dome 110 (and thus more proximal to the center of mass of the subcombination apparatus 200) and "distal" means towards or under the concave side of the dome 110 (and therefore more distal from the center of mass of the subcombination apparatus 200). The subpart comprising the dowel 115 and the suction cup 112, depicted by itself in FIG. 16, is movable independently of the other elements in the subcombination apparatus 200, particularly in that the dowel 115 and attached suction cup 112 may rotate freely clockwise and/or counterclockwise about the longitudinal axis of the dowel 115 as it sits within the aperture of the dome 110 while the lever 120 is open, as shown in FIGS. 15 and 19B where range of motion is represented by a shaded double-headed arrow in FIG. 15. The remainder of the subcombination apparatus essentially comprises another subpart or a second set of elements that are all attached to each other and therefore appear to rotate in unison around the axis of the dowel 115 when the suction cup 112 is attached to a surface in the environment and the lever 120 is open, as shown in FIG. 19B. This feature is important because rotation of said remainder (denoted hereinafter for simplicity as the "dome and rod portion of the apparatus") causes the rod 12 to tilt longitudinally relative to whatever surface to which the suction cup 112 is attached; and, this longitudinal tilt of the rod 12 affects the positioning of the frame 20 suspended from the rod 12 by virtue of the cordage 15 attached to the spools 122 and 123, which is evident in FIG. 19B. In this way, clockwise or counterclockwise rotation of the dome and rod portion around the dowel 115 causes tilting of the rod 12 and thereby provides a means for making fine adjustments to the angle at which the rod 12 projects from the subcombination apparatus 200 while attached to a mounting surface and, consequently, for making adjustments in the orientation of the frame 20.

In a preferred embodiment as depicted in FIG. 16, the dowel 115 is fixedly attached at its distal end to a plate 109 (of metal, plastic, or other sturdy material) that comprises a means for stably affixing said suction cup 112 to said dowel 115, but any suitable means for attaching the dowel 115 to the suction cup 112 may be employed. Suction cup 112 is manufactured of rubber, plastic, or other flexible material suitable for performing one or more attachment functions known (presently or in the future) in the arts relevant to suction cups and equivalent fasteners. In preferred embodiments, the suction cup 112 is attached such that it does not rotate independently of the dowel 115, but alternative embodiments permit such rotation. At the proximal end of the dowel 115, which is the end opposite from the suction cup 112, the terminal knob 116 interfaces with a lift block 117 connected to a lever 120, as depicted in FIGS. 15 and 17, such that pushing down on the lever 120 causes the lift block 117 to engage the terminal knob 116 from the underside of the terminal knob 116, and then to lift it upwards (i.e., towards the proximal) from a fulcrum provided by side pins 118 rotating within pin mounts 119 that are attached to the dome 110 such that the dome 110 and the suction cup 112 are moved towards each other. When the lever 120 is fully closed (FIG. 17), the rim of the dome 110 is pressed tightly against a portion of the suction cup 112 and the resulting friction prevents any further rotation of these two elements relative to each other around the axis of the dowel 115. In preferred embodiments, an array of teeth 111 or other gripping means project distally from an edge or rim of the dome 110, said teeth 111 facing towards the suction cup 112, where said teeth 111 are preferably molded from or constituent in the same piece of material that comprises the dome 110. Said teeth 111 thus serve as a gripping means for facilitating the temporary attachment of the dome 110 to the suction cup 112 whenever pressure is applied to push the dome 110 outwards/downwards/distally along the axis of the dowel 115 and against the suction cup 112, such as when the lever 120 is depressed. By maintaining the dome 110 in this position of being firmly pressed against the suction cup 112 such that the teeth 111 impinge upon the material of the suction cup 112 while the suction cup 112 is stably attached to a mounting surface in the environment, the clockwise and counterclockwise rotation of the dome and rod subpart is prevented (with respect to reasonable amounts of applied torque) and thus the axial orientation of the rod 12 is temporarily fixed in a desired position, as depicted in FIGS. 19A and 19B. Various alternatives to "teeth" (angular protrusions) may substitute for the teeth 111 as the means for enabling the dome 110 to grip the suction cup 112 in this or an equivalent manner, such that the result is to reversibly fix the dome 110 and the suction cup 112 in abutment and to thereby reversibly allow or prevent rotation of the "dome and rod portion of the apparatus" around the dowel 115. FIG. 17 depicts the subcombination apparatus 200 with the lever 120 in a closed position while the suction cup 112 is stably attached to a glass surface (not shown), wherein the teeth 111 are pressed against the edge of the suction cup 112, thereby preventing rotation of the dome 110 and of the rod 12 around the dowel 115.

The lever 120 acts upon the proximal end of the dowel 115 via a lever assembly comprising said lever 120, two side pin mounts 119 holding side pins 118 serving as the fulcrum for the lever assembly, where said side pins 118 also intersect a lift block 117 that moves up and down in loose contact with the axis of the dowel 115 as the side pins 118 move up and down in their parallel tracks in their respective pin mounts 119. Thus, the lift block 117 conditionally engages the terminal knob 116 of the dowel 115. When the lever 120 is pushed from an open to a closed position, a part of its arm contacts and is deflected by the dome 110 which causes the side pins 118 to move upwards or proximally within the pin mounts 119 thereby carrying the lift block 117 correspondingly upwards or proximally to engage with the terminal knob 116, which is then itself pushed correspondingly upwards or proximally thereby transferring a pulling force along the dowel 115 to the suction cup 112. Whenever said suction cup 112 is stably attached to a stationary surface in the environment, this pulling force effectively pushes the dome 110 down the axis of the dowel 115 distally towards the suction cup 112 until it (and its teeth 111, if any) impinges directly against the suction cup 112. The side pins 118 may comprise screws with their heads on the outside of the pin mounts 119 and with their threaded portions passing through their respective channels in the pin mounts 119 and terminating in the the lift block 117. The pin mounts 119 preferably comprise durable tabs (e.g., of plastic or metal) projecting from the proximal (convex) surface of the dome 110 and being fixedly attached thereto, by a glue for example, or as a single molded piece as part of the dome 110. In a preferred embodiment, each of said pin mounts 119 comprises a central channel in which one of the side pins 118 is confined such that said side pin 118 has freedom to move short distances through the channel in directions parallel or anti-parallel to the orientation of the axis of the dowel 115. When the lever 120 is open (FIG. 15) the side pins 118 rest in the channels of the pin mounts 119 at positions nearer to the dome 110; conversely, when the lever 120 is closed (FIG. 17), the side pins 118 rest in the channels of the pin mounts 119 at positions farther away from the dome 110. As the lever 120 is moved from its open to its closed position, the "dome and rod portion of the apparatus" is effectively pushed pushed downwards or distally along the axis of the dowel 115 by virtue of the lift block 117 impinging upon the terminal knob 116, and, by virtue of the side pins 118 having freedom to slide away from the dome 110 inside the channels of the pin mounts 119. When the lever 120 is fully closed or locked, the teeth 111 are pushed against the suction cup 112 with the maximum available force and rotation of the dome and rod portion of the apparatus is effectively prevented. When the lever 120 is substantially or fully open, this condition allows for the dome and rod portion of the apparatus to both rotate around the dowel 115 and move alternately upwards/proximally and downwards/distally along the axis of the dowel 115 (albeit over a very short distance of roughly 0.25 to 1.0 inches, depending on the length of the dowel 115, the thickness of the lift block 117, the range of the side pins 118 within the pin mounts 119, and other structurally limiting factors in particular models/embodiments). Other means, including motorized means, for applying upwards or downwards force upon the dowel 115 may be employed in other embodiments according to any means known in the art for moving two subparts of an apparatus towards and/or away from each other.

Figure 18:
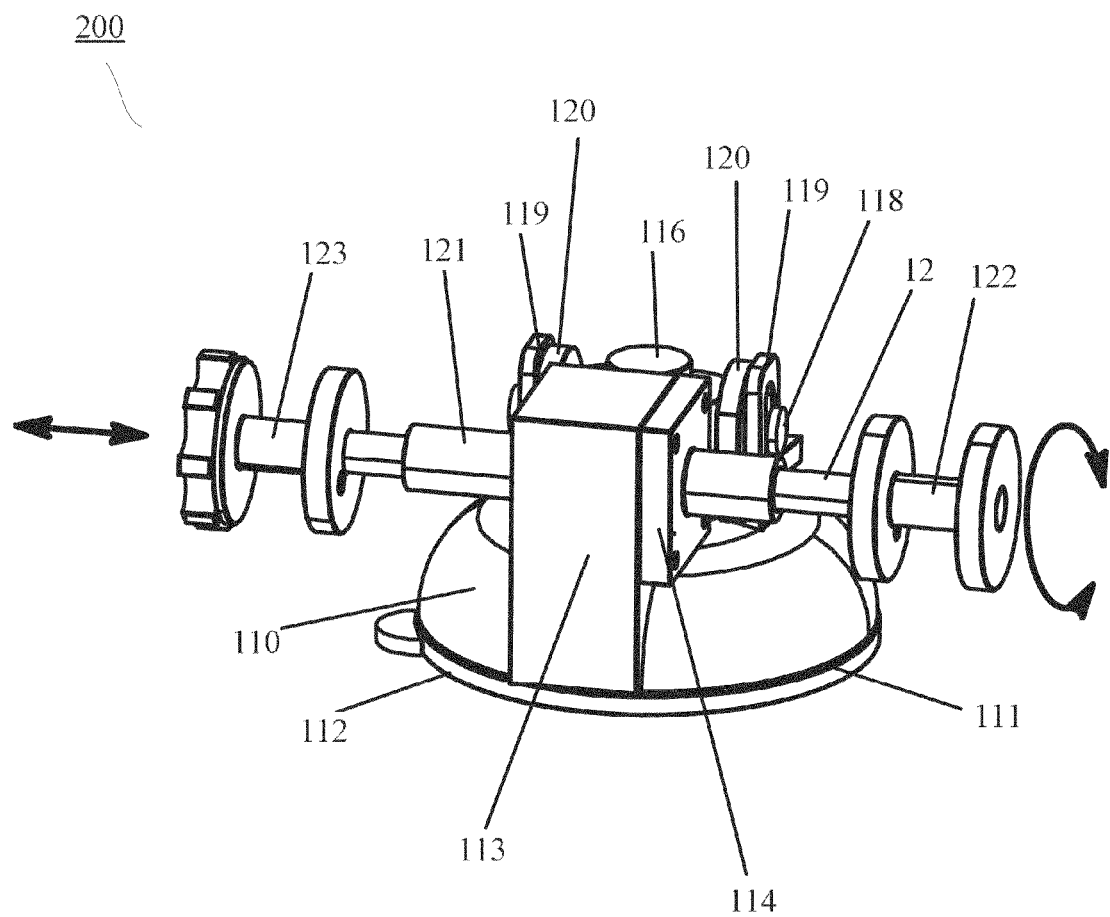
FIG. 18 is a rear perspective view of the preferred embodiment of the mounting and adjusting subcombination apparatus depicting the lever in a closed position such that the dome having teeth impinges on the suction cup.

FIG. 18 shows the same embodiment of subcombination apparatus 200 from a rear perspective view, providing a more direct view of the connector element or block 113. Here, block 113 is substantially shaped as a cube approximately 0.25 to 1.0 inches long on each side, although any shape is permissible, which block 113 is substantially hollow and adapted to house a shaft-locking means within it. An access plate 114 can be reversibly attached to one or more sides of said block 113 to permit assembly of or access to the inner mechanism comprising the shaft-locking means (see FIGS. 20 and 21, explained below). Said access plate 114 is depicted as a single panel of the block 113 but may comprise multiple panels or even an entire the top half portion of the block 113. The block 113 has an aperture in each of its two lateral side walls through which the rod 12 passes and in which the rod 12 may rotate unimpeded. In some embodiments, the lateral side walls of the block 113 do not comprise mere holes as said apertures, but rather they comprise hollow tubes or barrels 121 that extend outwards from the block 113 to create elongated apertures or "sleeves" that help stabilize the rod 12 and guide its rotation about its longitudinal axis (where said rotation is represented by the semicircular double-headed arrow in FIG. 18), which axis projects longitudinally through the approximate center of the block 113. These sleeves 121 may be fashioned from the same piece of material as the block 113 (as when made from a single mold or manufactured using a 3D printer) and may be located partially or wholly on the access plate 114. At either end of the rod 12, a spool 122 and/or 123 serves as an adjustment means 14 for adjusting the length of the cordage 15 that extends between the hanger 12 and the frame 20, where each of said spools is attached to an end portion of the cordage 15 as described for previously presented embodiments (e.g., FIG. 1) and as depicted in FIGS. 19A and 19B. A rear wall and/or other side of the block 113 may be adapted or elongated to affix it securely to the dome 110, and in preferred embodiments the block 113 (minus its access plate 114) is formed or molded from the same piece of material as the dome 110, for example as if created from a 3D printer.

FIG. 20 is a plan view of the rear side of an inverted mounting and adjusting subcombination apparatus 200 as if the embodiment shown in FIG. 18 had been flipped 180 degrees clockwise. FIG. 21 is a partial section view from a left-hand perspective of the same structure, not necessarily drawn to scale, depicting the shaft-locking means for reversibly preventing and allowing rotation of the rod 12 about its longitudinal axis. The portion of the rod 12 passing through the block 113 comprises a plug 133 having a shape complementary to a plug receptor 134, said plug receptor 134 being attached not to the rod 12 but instead to the block 113 (preferably as a shape or sconce molded into the inwards-facing surface of one or more side walls of the block 113). The plug 133 on the rod 12 may physically engage the plug receptor 134 in a key-in-lock type of geometric alignment. When so engaged, the plug 133 cannot rotate within the plug receptor 134 and therefore the rod 12 may not rotate around its longitudinal axis. Said engagement is caused to occur by the application of a force to the rod 12, for example, when a person pushes laterally against an end of the rod 12 or when an internal spring 132 (explained below) pushes the rod 12 in a direction parallel to its longitudinal axis such that the attached plug 133 is pushed into the plug receptor 134 of the block 113. When the plug 133 engages the plug receptor 134, their geometric complementarity prevents them from rotating relative to each other which in turn prevents the rod 12 from rotating in its housing in the block 113. For example, the plug 133 may have a star-like or gear-like shape with spokes extending from a central body that have been fabricated to fit snugly into complementary apertures in the one or more sidewalls of the block 113 comprising the plug receptor 134, as indicated in FIGS. 20 and 21. Any other suitable geometries, including one or more of a peg and a hole, may be employed for making the plug 133 complementary to the plug receptor 134 in this manner. In preferred embodiments, this shaft-locking means also comprises a spring 132 wound around the axis of the rod 12, in particular around the portion of the rod 12 passing through the block 113, where a first end of the spring 132 abuts an internal wall or edge of the block 113 opposite from the plug receptor 134 and a second end of the spring 132 abuts the plug 133. In FIGS. 20 and 21, said first end of the spring 132 abuts the inside surface of the access plate 114 (which is shown in a partially disassembled configuration where the access plate 114 has been removed and shifted leftwards from the block 113 as represented by the unshaded double arrow in FIG. 20) while said second end of said spring 132 is shown impinging upon the plug 133. Thus, the spring force pushes from a first side of the block 113 opposite from the location of the plug receptor 134, towards the plug 133 and towards the plug receptor 134, such that the spring 132 pushes the plug 133 into the plug receptor 134 when properly aligned geometrically. Proper alignment is achieved in most embodiments by rotating the rod 12 around its longitudinal axis (which rotates the plug 133 in tandem) until the spokes or other shape of the plug 133/receptor 134 combination are in a complementary juxtaposition suitable for engagement. To disengage this shaft-locking means, a person or a motor or other mechanism pulls on the end of the rod 12 such that the plug 133 is pulled away from the plug receptor 134, which incidentally is to pull opposite the direction of the spring force in embodiments that comprise a spring 132. Alternatively and/or additionally, the shaft-locking means may be configured in the converse such that pushing on an end of the rod 12 achieves the disengagement. The lateral motion of the rod 12 parallel to its longitudinal axis is represented by the shaded double-headed arrow in FIGS. 18 and 20. This feature, the shaft-locking means, is preferably employed where the spools 122 and 123 do not rotate independently of the rod 12, but such is not essential to the functionality of the apparatus as a whole; other arrangements in which said spools have independent motion are considered to be within the scope of the present invention.

A method that a person may use to mount the various tablet PC holder apparatuses of the present invention to a surface in the environment using the subcombination apparatus 200 (to create the configurations illustrated in FIGS. 19A and 19B, for example) comprises a first step of attaching the suction cup 112 to the target surface while the lever 120 is fully open. Before closing the lever 120, the suction cup 112 can be attached and reattached to the target surface until the most desirable mounting position is achieved, as is commonly done with any suction cup or equivalent fastener known in the art. The attachment and reattachment of the suction cup 112 may be facilitated by directly pushing or pulling on the dowel 115, such as by pushing or pulling on the terminal knob 116. Next, the person grips the dome 110 and gently rotates it around the dowel 115 until the longitudinal tilt of the rod 12 is satisfactorily aligned relative to the chosen mounting position and user preferences. Then the person closes the lever 120 to fix the rod 12 in this final angular position, and next the person pulls axially on the end of the rod 12 to disengage the shaft-locking means, allowing the rod 12 to rotate along its longitudinal axis while housed in the block 113, and then the person further proceeds to rotate the rod 12 a sufficient number of revolutions until the desired effective length of the cordage 15 is achieved. After this, the person adjusts the axial rotation state of the rod 12 so that the plug 133 aligns with the plug receptor 134, and finally the person allows the spring 132 (or pushes/pulls directly on the end of the rod 12 when no spring is present) to cause the plug 133 to engage the plug receptor 134. At any time before and after these steps, the length of the cordage 15 descending from the rod 12 may be adjusted to place the frame 20 in a desired final location relative to the mounting position of the apparatus 200, and the dome 110 can be re-adjusted and rotated slightly to finely control the tilt angle of the rod 12, and other adjustments can be made as described for the various other embodiments of the present invention. Thus, a quick and convenient means for making multiple adjustments to the placement and positioning of the apparatus 100 of the present invention can be provided by a simple, lightweight, durable, single integrated piece corresponding to the subcombination apparatus 200. However, the utility of the subcombination apparatus 200 is not limited to use with the present invention 100, and it may be incorporated into any other separate and distinct composition of matter where its integrated mounting and adjusting features are desired.

Figure 22:
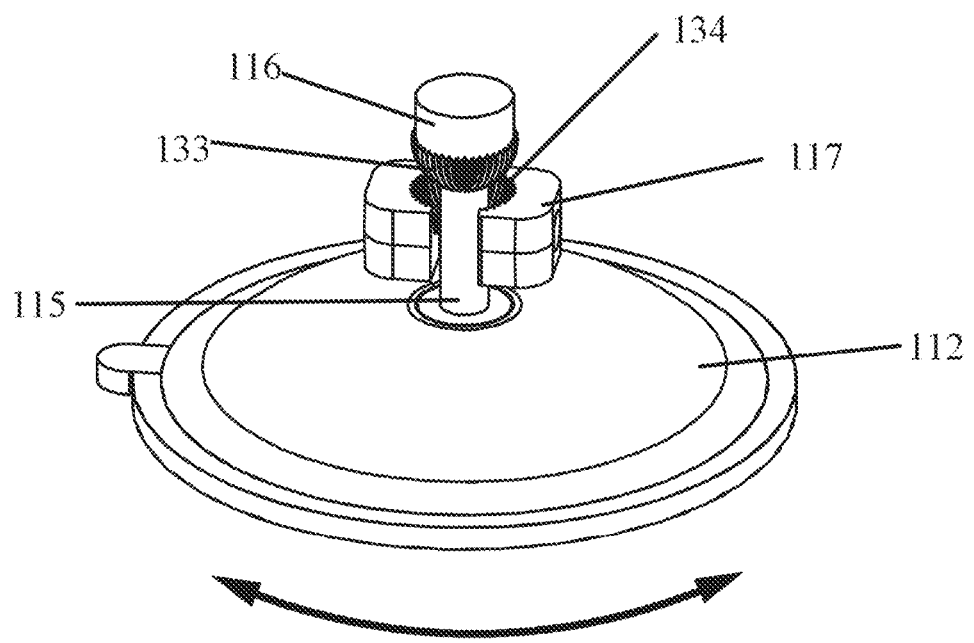
FIG. 22 is a partial section view of the dowel-locking means.

The concept of the shaft-locking means may also be applied to the dowel 115 to provide a dowel-locking means for reversibly allowing and preventing rotation of the dome and rod portion of the apparatus around the dowel 115. FIG. 22 illustrates an embodiment of the subcombination apparatus 200 in which a plug 133 is attached to the body of the dowel 115 (preferably on the underside of the terminal knob 116) and a plug receptor 134 is provided in the lift block 117. Thus, when the lever 120 is depressed the lift block 117 moves towards the plug 133 and causes it to engage the plug receptor that exists on the lift block 117. Once engaged, the dowel-locking means provides a second restraint on the ability of the subpart comprising the dowel 115 and suction cup 112 to rotate, where the first restraint remains, as described above, in the friction produced at the point of contact between the teeth 111 of the dome 110 and the suction cup 112.

Waterproofing and Ruggedizing Modifications

Because the present invention is suitable for mounting the apparatus 100 in marine environments and other outdoor applications, for example for using an apparatus of the present invention to mount a tablet PC from the windshield of a boat, it is advantageous to provide extra waterproofing means for protecting the tablet PC or other mounted device from salt water, concussions, vibrations, and the elements in general. Products exist in the prior art for encasing tablet PCs and other devices in various cushioning and waterproofing sleeves or containers, including for example, the Joy Factory Bubbleshield and the Dry Case waterproof vacuum sealed container, which can be used with most preferred embodiments of the apparatus of the present invention. In these examples, a person using the mounting apparatuses of the present invention may enclose a Tablet PC 3 in such a waterproofing or cushioning container and then insert the wrapped device into the frame 20 between clip pairs 21 and 22 as would be performed when inserting an unwrapped device. Alternative embodiments of the present invention provide plastic panel shields or coverings prefabricated to fit around the clips and frame 20 so that the mounting apparatus 100 itself can be substantially shielded, enclosed, or wrapped in protective material without requiring that the tablet PC 3 or other device itself be directly wrapped. In one embodiment providing extra weatherproofing capabilities, the weatherproofing means comprises one or more clear plastic panels that are attached as a separate component over and around the underlying apparatus 100 and/or 200. In other embodiments, said extra weatherproofing can be prefabricated into the frame of the apparatus as an extension of one or more sides of the frame 20 or as enlarged clips adapted from clips pairs 21 and 22, preferably comprising clear plastic clips that cover and/or enclose substantially the entire mounted tablet PC or device while inserted into the frame 20. A sealable top cover or side cover on the frame 20 can be opened or closed to permit the device to be inserted and removed from the apparatus in those embodiments. Furthermore, shock absorbing means may be included in the clips (one example of which is illustrated in FIGS. 5A and 5B, elements 30 and 31). Additionally or alternatively, enhanced shock absorbing and ruggedizing features may be included in the stabilizer attachment means 26.

It should be emphasized that the above described embodiments of the present invention exemplify some, but not all, possible implementations of the present invention and have been set forth in order to provide a clear understanding of its qualities. Those skilled in the art will appreciate that the conception upon which this disclosure is based may readily be utilized as a basis for designing of other structures, methods, and systems for carrying out the several purposes of the present invention. The following claims should be regarded as encompassing equivalent and various constructions insofar as they do not depart from the spirit and scope of the methods and devices consistent with the present invention.

Miniature Parts for the Several Embodiments

"Miniature" is a relative term generally meaning "very small" or "smaller," which is used to differentiate between those larger, bulkier or more rugged parts like as described among the preceding embodiments and those lighter, compact and more delicate parts some of which are to be described now in this section. Various miniature parts and features are desirable, for example, when there is limited or cramped space to mount an apparatus in a particular location, and when a device is small and lightweight such that its use within a bulkier mounting apparatus would be cumbersome, and when economic considerations require a reduction or simplification of materials in manufacturing stages. Herein are described two miniaturized parts of the invention, for which support exists in the preceding disclosure, but which were not given as specific examples for pragmatic purposes above, which two miniature parts are: (1) a miniature embodiment of the adjustable frame 20, and (2) a miniature stabilizer 26 comprising a threadable cleat 150 for gripping a surface in the mounting environment from attachment points on the cordage 15.

Miniature Frames and Crossover Slat Configurations

Figure 23B:
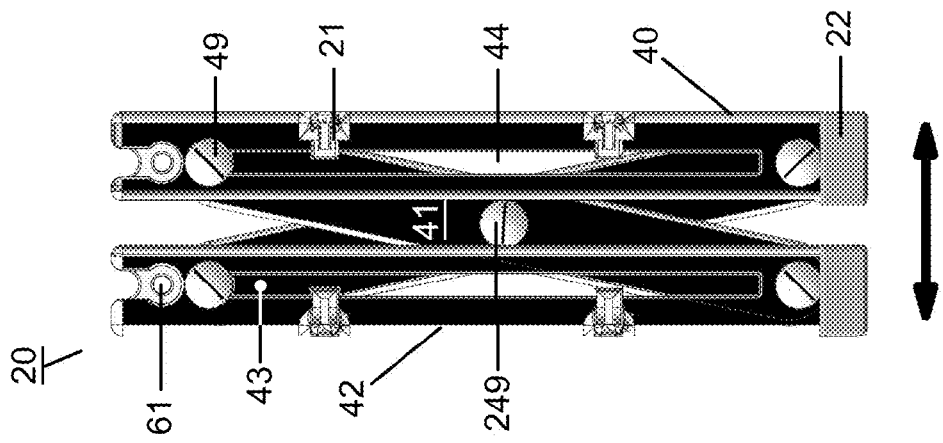
FIG. 23B is a front view of the miniature embodiment of the adjustable frame of the invention wherein the slats that constitute the top side and the bottom side of the frame are arranged in a crossover configuration; and the frame is positioned in a closed state for compact storage and to illustrate the full extent of its range of adjustability.
Figure 23A:
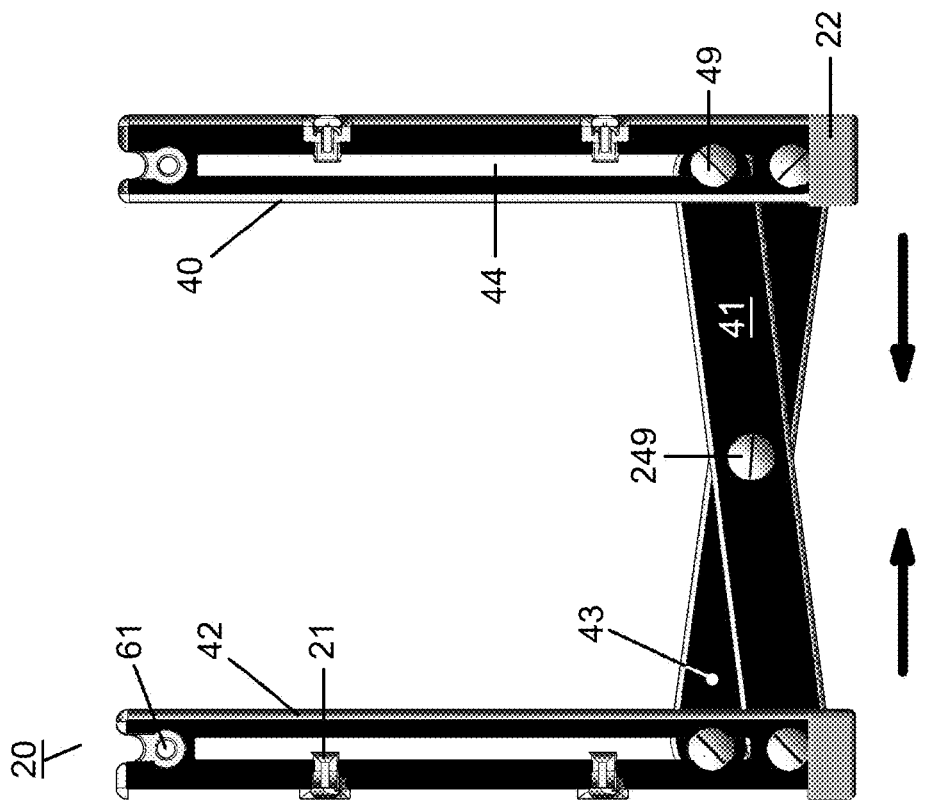
FIG. 23A is a front view of a miniature embodiment of the adjustable frame of the invention wherein the slats that constitute the top side and the bottom side of the frame are arranged in a crossover configuration; and the frame is positioned in an open state for receiving a small electronic device.

The adjustable frame 20 of the invention as previously illustrated in FIGS. 11 through 14 comprises four sides, which are represented by slats 40, 41, 42, and 43, arranged in a quadrangle and which may be fastened one to another via fastening means such as bolts 49. When any of said slats comprise a pair of sliding members, such as when additional slats 58 and 59 are combined with slats 41 and 43 as previously illustrated in FIGS. 11 through 14, therein is a means for adjusting the size of the frame 20 by extending and retracting the length of the sides having the sliding pairs 41+58 and 43+59, said adjustment means being inherent in the arrangement of slat pairs sliding one over the other. But the nature of this sliding-slat adjustment mechanism entails a caveat dictating that the minimum length of any dimension of the quadrangular frame, where said dimension is determined by the lengths of two parallel sides, will be at least equal to, and of course never less than, the length of the longer slats of the slat pairs making up those two sides of the frame. And by corollary, the maximum length achievable for any dimension of the frame is the sum of the lengths of the two slats in any respective sliding pairs minus whatever diameter is occupied by the fastening means (e.g., the bolt) that connects them. However, an alternative to the sliding-slat adjustment mechanism is the adjustment mechanism whereby, instead of arranging slats 40, 41, 42, and 43, in a quadrangular configuration, two parallel sides of the frame 20 are crossed over each other (such as by crossing the right 42 and left 40 slats, or the top 41 and bottom 43 slats) as depicted in FIGS. 23A and 23B to create a transverse or "crossover" configuration between said two slats/sides. Therein, a fastening means 249 is placed through the center of the two crossing slats 41 and 43, binding them together at a common junction, and is configured to permit rotation around its longitudinal axis (e.g., because it is a bolt mounted loosely, or a bolt having an unthreaded portion where it passes through both crossed slats, or a peg having a rotatable outer cuff), thus making this fastener a pivoting means 249. Said fastener and pivoting means 249 thus permits the two crossing slats/sides 41 and 43 to rotate lengthwise in tandem around the pivot 249, in either clockwise or counterclockwise manner, where each slat/side rotates in the opposite direction but by an equal measure of degrees relative to the other slat/side, in order to regulate the length of one dimension of the frame 20, which dimension is the same as that dimension that would formerly have been determined by the same two slats/sides while they were in the quadrangular configuration.

In FIG. 23A, the top 43 and bottom 41 sides are single slats and not sliding pairs. The terms "slat" and "side" will be used interchangeably as representing equivalent structures henceforth herein for the sake of simplifying the discussion; but this does not mean that the cross-over configuration is not compatible with sliding pairs of slats. The invention comprises embodiments in which a sliding slat mechanism may be present in any or all of the sides of a frame simultaneously with any two sides of the frame in a crossover configuration.

Each of said slats 41 and 43 have two ends, where each end is attached to an adjoining side of the frame 20 by a fastener 49 that passes through a groove 44 (i.e., a track, a channel) in the adjoining side to which it is secured, but in which the fastener 49 may move positionally along the length of said groove 44 by sliding therein, for example, or by being manually repositioned therein by loosening and then re-tightening it in a new position. Said adjoining sides are slats 40 and 42 respectively in this example. These two crossing slats 41 and 43 (i.e., the "crossover slats" or "crossover sides") are joined at their common centers by the pivoting means 249, which here is a bolt, around which these slats can counter-rotate lengthwise. Because the ends of the crossover slats 41 and 43 remain connected to the ends of the adjoining sides 40 and 42, the crossover slats can be adjustably moved and caused to counter-rotate around the pivot 249 by the act of pushing the adjoining two sides inwards towards each other as indicated by the shaded arrows in FIG. 23A. This causes a decrease in the length of the horizontal (x) dimension of the frame 20, narrowing the distance between the lateral clip pairs 21 and bringing the clips 22 on the bottom of the frame closer together at the same time. Inversely, pulling the two adjoining sides 40 and 42 in the opposite direction, outwards away from each other, causes an increase in the length of the horizontal dimension (x) of the frame 20, as represented by the bidirectional arrow in FIG. 23B.

Because the ends of any two crossover sides are connected to the respective adjoining sides of a frame 20 in grooves 44 (e.g., guiding channels), and because their respective fasteners 49 may slide along the length of said grooves 44, the act of counter-rotating the two crossover sides expands and contracts the effective length of the frame in whichever dimension (e.g., horizontal or vertical; (x) or (y)) of the frame would have been determined by the length of those two sides if they had been in a quadrangle configuration. But when any two sides are transformed into the crossover configuration, the minimum length restriction imposed by the previously described sliding-slat configuration for adjustability is abolished. This outcome is depicted in FIG. 23B, in which the two adjoining sides 40 and 42 have been pushed inwards until they met adjacently, causing the two crossover sides 41 and 43 to counter-rotate around the pivot 249 until in a nearly overlapping parallel alignment, as meanwhile the sliding fasteners 49 moved away from each other by sliding towards the outermost ends of the grooves 44, and thereby adjusting the frame 20 so that it has adopted a fully "closed" state with respect to its horizontal dimension. When such a conformation is adopted for the purposes of storing the frame 20, this state may also be referred to as a "collapsed" state. While all four fasteners 49 were made slideably adjustable in this example, it is possible to achieve the same results when only the top two fasteners 49 are permitted to move in the groove 44 and while the bottom two fasteners 49 remain fixed at the bottom corners of the frame 20.

This crossover arrangement of sides, therefore, is a frame size adjustment mechanism of the invention that overcomes the minimum length limit that applies to the quadrangular frame configuration for any one dimension of the frame 20 of the apparatus (e.g., either the width (x) dimension or the height (y) dimension), thus enabling the apparatus of the invention to more efficiently hold devices that are particularly small in size, if and when necessary, and also permitting the placement of the apparatus into particularly cramped mounting locations. It should be noted that a possibility remains even in the crossover configuration that some embodiments of the frame 20 may remain subject to a minimum length limit in the dimension that is determined by the crossover slats, but the factor that imposes this limit is the length of the grooves 44, which determines the range of travel available for the fasteners 49 at the two ends of the crossover slats to slide along the adjacent slats, and in particular their ability to slide away from each other when the frame is being pushed into a closed or collapsed state. In order for crossover slats to adopt the fully closed state, the range of motion available to the fasteners 49 within the grooves 44 and along the length of the grooves 44 must be sufficient to allow both ends of the crossover slats to slide away from each far enough to allow the crossover slats to align with each other in a nearly parallel orientation. In other words, the grooves 44 of the adjacent sides must extend for a length at least as long as the length of the crossover slats (as a rule of thumb; roughly and generally speaking, ignoring the diameters of the fasteners 49 and pivot 249, the widths of any of the slats, and other minutiae).

Miniature frames 20 are preferably manufactured specifically for permanent use in the cross-over configuration; however, quadrangular frames 20 of the present invention may be conveniently converted into the crossover arrangement, if they comprise the requisite elements such as: the grooves 44 in adjacent sides of the frame, the adjustable fasteners 49 at the four ends of the crossover slats, a central hole or other fixture in each slat through which the pivoting means 249 may be placed to connect the two counter-rotating slats one above the other, and where the clips 21 or 22 are attached to the non-crossover slats. Regarding this latter detail, note that in the miniature frame 20 of FIGS. 23A and 23B, the two bottom clips are attached to the bottom ends of the two lateral (adjacent side) slats 40 and 42, which is not necessarily the way all frames of the invention are constructed, as other embodiments may be built with one or more bottom clips 22 attached to the bottom side of the frame 20. With regard to manufacturing and composition of miniature frames, the parts and features of a frame in a crossover configuration are made of equivalent materials and by similar methods as for the other embodiments previously described and illustrated in FIGS. 1-22.

A method for transforming an amenable quadrangular frame 20 into a crossover configuration may comprise the steps of: First, removing both fastener(s) 49 from one adjacent side of the frame 20, which side is the adjacent side to which both ends of the crossover slats are initially attached (e.g., adjacent side 42). Second, crossing either of the two unfastened slat ends over the other slat to position the two crossover slats in a transverse configuration. Third, aligning the two centerpoints of the crossover slats and inserting or applying the pivoting means 249 thereto (e.g., inserting the bolt 249 through the central holes that were prefabricated into the slats at the appropriate positions to receive a pivoting means). Fourth, reattaching the two free ends of the crossover slats to the groove 44 in the adjacent slat from which they were detached in step 1, where the reattachment of each end of each crossover slat is to the corner on the adjacent slat opposite of that corner from which it had been previously fastened (e.g., the end of the crossover slat which had previously been attached at the bottom corner of adjacent side 42 is now attached at the top corner of adjacent slat 42), said attachment comprising the joining of the end of the crossover slat via the fastener 49 into the groove 44 of the adjacent side (e.g., 42).

This alternative configuration comprising crossing sides of the frame 20 is especially advantageous in certain situations, like when the tablet PC or other device that a person wants to mount has a length or width dimension of less than about four inches, because the quadrangular embodiment with sliding-slats would comprise an excessive or wasteful quantity of mass and/or bulk compared to that which is sufficient to accommodate a mounting task on such a small scale. These considerations may not be important to most users, but may be critically important to people engaged in activities where there are serious restrictions on weight and size of cargo, for example, bike racing, flying and other aerial travel, various motorsports and watersports, traveling on crowded mass transportation systems, or even an ordinary mounting task performed by someone with an especially sensitive taste for efficient design and aesthetics. Or, in some mounting environments, a person may simply be restricted by having limited or cramped space on their dashboard, captains deck, passenger compartment, or other mounting area, and therefore they are forced to use compact or miniature personal electronic device requiring a proportionally miniaturized mounting apparatus. Also advantageously, this crossover configuration may be adopted during storage of the apparatus, so that the frame can be collapsed into a minimum dimension during stowage in a compartment or a travel bag. Because preferred embodiments of the quadrangular frame may be prefabricated with the necessary features to convert relatively quickly and easily to the crossover configuration, even on short notice, this convertibility spares people who face various potential restrictions related to weight, bulk, and space from being compelled to own or carry multiple frames in order to remain prepared for such contingencies. Note that applicant intends to claim all possible embodiments, including larger, non miniature, bulky, rugged, and otherwise collapsible frames of the present invention having the crossover configuration, and all obvious variants thereof.

Miniature Stabilizers

Another consideration when mounting a tablet PC or any other electronic device in the frame 20 of the present invention, and particularly when mounting the apparatus in cramped areas, over uneven surfaces, or under otherwise challenging conditions, involves stabilization. Stabilization of the frame 20 entails many types of adjustments to address a host of potential issues, such as leveling it when it sits over an uneven surface, preventing it from wobbling when the user interface of the mounted device is touched, tilting it to a desired angle so that the screen of the mounted device faces squarely towards the user, and preventing it from swaying as it hangs from the cordage 15 descending from the hanger 12 and mounting means 11. The versatile stabilizer attachments means 25 and various stabilizers 26 of the invention generally provide a range of optional attachments for addressing these and other contingencies, as illustrated, for example, in FIGS. 3, 4A and 4B. Not only is the invention made more stable by the collective contribution of its multiplicity of stabilizing parts, but also is the user able to troubleshoot nearly any mounting challenge because of the functional redundancy available whenever the mounting environment vitiates the stabilizing contribution of any part of the apparatus. It was stated previously in this disclosure that stabilizers 26 may interact with the dashboard or console of an automobile to prevent the frame 20 and tablet PC 3 from swaying, twisting or otherwise shifting position during movement of the vehicle. The ensuing discussion concerns embodiments of a stabilizer means for addressing swaying, and this scenario especially (although not exclusively).

Stabilizers 26 of the invention attached to the rear side of the frame 20 were described above (see, e.g., FIGS. 4A and 4B). The stabilizers 26 depicted in FIGS. 24-26 comprise small individual accessories resembling bumpers or cleats, which are not only compatible with the versatile stabilizer attachment means 25 for placement on the frame 20 but which are also attachable to the cordage 15 by threading them upon a portion thereof that extends between the frame 20 and the rod 12 or mounting means 11. When attached to the stabilizer attachment means 25, these miniature bumpers or cleats may be reversibly positioned thereon by any of the previously described means for doing so. But the threadable stabilizer cleats 150 comprise a means for being threaded 151 onto the cordage 15, so they may provide stabilization to the frame 20 from a position apart from or in addition to stabilizers positioned on the back of the frame 20, and they can be arrayed and positioned anywhere along the length of the cordage 15 of an apparatus 110 where an appropriate particular stabilization effect is desired.

FIG. 24 depicts two threadable stabilizer cleats 150 attached to the cordage 15 by their threading means 151, one on each side of the apparatus 110, and they have been adjustably positioned to sit approximately one third of the way up the length of the cordage 15 as it ascends from the frame 20 to the rod 12 in an apparatus 110 that resembles the embodiment 100 that was previously illustrated in FIG. 1. But the apparatus 110 shown in FIG. 24 differs slightly because the first embodiment 100 had additional stabilizers 26 attached to the rear of its frame 20, which are not present here in the embodiment 110. These minor structural changes made via interchangeable arrangements of stabilizers 26 highlight the exceptional and advantageous versatility of the mounting apparatus of the invention, and the changes in FIG. 24 signify that this apparatus 110 is mounted in a different location that poses slightly different stabilization requirements than that which applied to the apparatus 100 of FIG. 1. In other instances, it may be desirable to employ different varieties of stabilizers 26 on both the cordage 15 and the frame 20 in even more such alternate combinations and arrangements.

FIG. 25A is a top-front perspective view of a first example of a type of stabilizer 26 constituting a threadable stabilizer cleat 150. Its principal features comprise a longitudinal tube 151, or threading means for receiving and retaining the cordage 15, through which cordage 15 is to be threaded (not shown) directly into one end of the tube 151 and out of the other end thereof prior to the mounting of the apparatus 110, and thus the stabilizer cleat 150 provides a means for slideably retaining itself on the cordage 15. Said stabilizer cleat 150, after being threaded onto a length of said cordage 15, is retained there adjustably because the inner diameter or width of said tube 151 is sufficiently large so that the cordage 15 is not pinched or constricted therein, and so that the cleat 150 can thereafter be pushed or slid along the cordage 15 to position it precisely according to whatever may be the conditions and contours dictated by a particular mounting environment. The tube 151 runs longitudinally down the center of the cleat 150, bisecting it, while the body of the cleat extends laterally on both sides to form a roughly square shaped perimeter, but which may also be circular or adopt other forms. This shape functionally serves to provide a contact surface area on one side (regarded as the underside) of the stabilizer cleat 150, said surface area comprising a gripping means 152, where the gripping means is a the platform or surface facing towards and making contact with an external object in the environment, such as a dashboard in a vehicle, a wall, a door, or a panel on an appliance, a handlebars, a tree branch, a fencepost, and any other conceivable object.

Said gripping means 152 in FIGS. 24 and 25A is simply comprised of the flat (i.e., planar) undersurface of the cleat without any elaboration thereon, but specialized means for enhancing the gripping ability 153 of the gripping means 152 are provided in alternative embodiments comprising studs, rough surface texture, an adhesive pad, or any specialized feature that may be advantageous for mounting the apparatus. FIGS. 25B and 25C show a top-front perspective view and a bottom-front perspective view, respectively, of a threadable stabilizer cleat 150 having an exemplary type of the grip-enhancing means 153 that comprises four studs, or four rounded protrusions having flat contact feet. The gripping means 152 of each cleat 150 provides added stability to the mounting apparatus 110, for example: it contributes a frictional force, and/or it also provides a focal point for any pressure that may be applied by tension in the cordage 15, against whatever external surface is contacted thereby, after the cleat 150 is placed in a position on the cordage 15 when an apparatus is mounted. The feet 153 modify and enhance this functionality, which can be described as comprising the directional and positional modification of friction and pressure applied by the apparatus upon the mounting surface(s) in the environment. These forces contribute to stabilizing the position of the frame 20 in almost any direction of force, for example by resisting lateral displacement such as that caused by swaying, and/or by disrupting the transfer of horizontal forces from the cordage to the frame such as that which might result if the mounting means 11 or rod 12 were disturbed.

Figure 26:
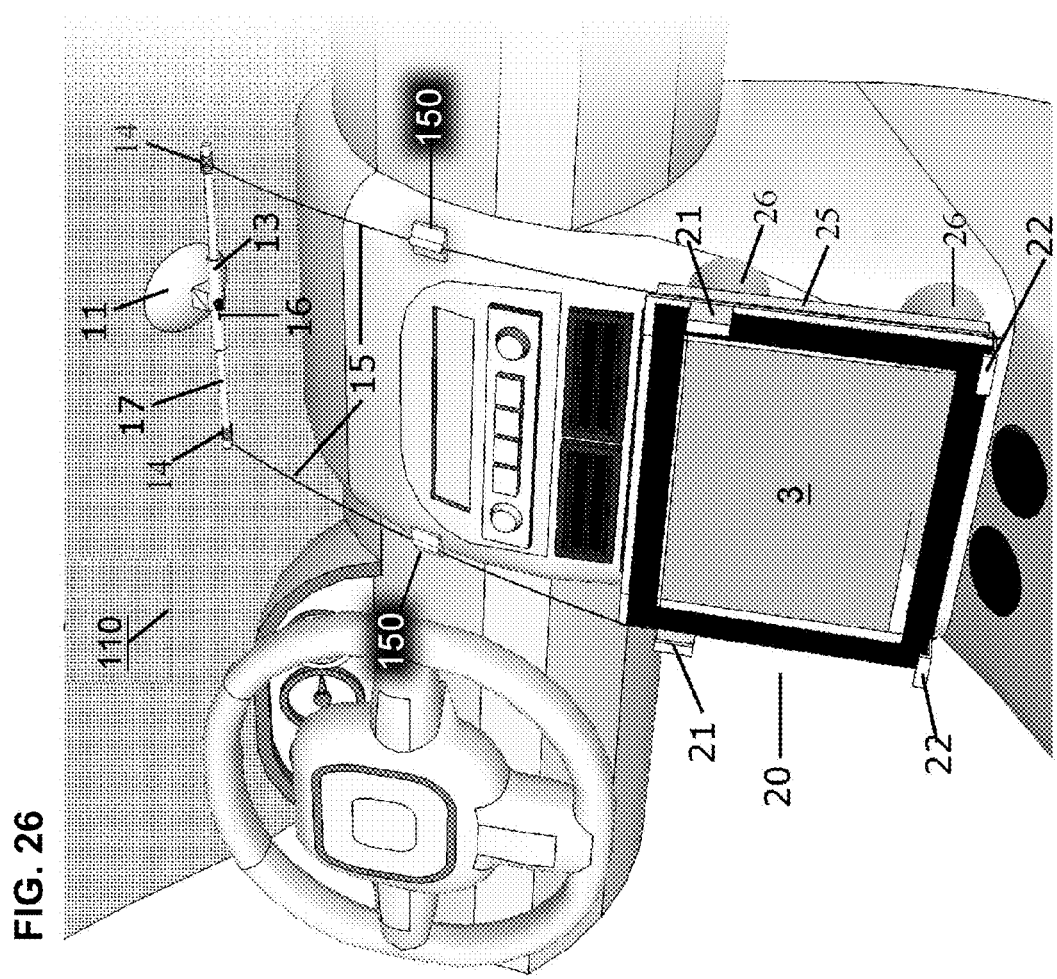
FIG. 26 is the perspective view of the invention being used to mount a tablet PC in the front compartment of an automobile, wherein the apparatus further comprises miniature stabilizers which each constitute a threadable stabilizer cleat attached to the cordage.

FIG. 26 is a perspective view of the interior of a motor vehicle (previously described in the discussion of FIG. 8, above) where an apparatus 110 is mounted. Here, two threadable stabilizer cleats 150 are positioned on the cordage 15 making contact with the dashboard, their bottom surfaces providing the gripping means 152 for securely establishing said contact with the dashboard's plastic surface. If the driver of the vehicle were to make a sharp turn, centripetal force might cause a pendulum effect to displace the frame 20 holding the tablet PC 3, but the cleats 150 guard against this, and they do so in conjunction with, or synergistically with, stabilizers 26 on the frame 20 itself. The cleats 150 have been adjustably positioned along the cordage 15 in order to align them where the cordage 15 most directly impinges upon the curved outer surface of the dashboard, where the maximum contact pressure will exist, and thus the maximum stabilizing force is generated by the gripping means 152. In this vehicle, the frame 20 has been set very low on the dashboard, presumably so that the other stabilizers 26 on the back of the frame 20 could make contact with the plastic lower dash panel, and not the radio or air conditioning panels in the middle area of the console. This situation has resulted in a relatively long span of cordage 15 being spooled out from the rod 12 up at the mounting means 11 on the windshield. It is to accommodate precisely these kinds of environmental idiosyncrasies and impediments that the present invention incorporates the various, multiple distributed features for stabilizing and adjusting different aspects of the mounting apparatus, so that no matter what conditions exist in the mounting environment, the invention in its preferred embodiment will provide a simple, effective, and very stable mounting solution.

Note that the stabilizer cleats 150 of FIG. 26 are drawn much larger than actual size to make them easier to see. In actuality the length and width of a cleat 150 each typically measure between about one half inch to one inch, although this should not be interpreted as a limitation of the invention. They may be made of any suitable material, preferably rubber, plastic, but also wood and metal; and the grip-enhancing means 153 may be a separately manufactured part having a different material composition than the rest of the accessory 150, or the entire accessory 150 may be manufactured as one single piece, such as one molded, sculpted, or printed piece (e.g., using a 3D-printer).

The above described embodiments of the present invention exemplify some, but not all, possible implementations and have been set forth in order to provide a clear understanding of its features. Those skilled in the art will appreciate that the conception upon which this disclosure is based may readily be utilized as a basis for designing of other structures, methods, and systems for carrying out the several purposes of the present invention. The following claims should be regarded as encompassing equivalent and various constructions insofar as they do not depart from the spirit and scope of the methods and devices consistent with the present invention.

I claim:

1. An apparatus for mounting a portable electronic device, the apparatus comprising:
    a mounting means connected to a hanger,
    cordage descending vertically from the hanger and attaching to a left side and a right side of a collapsible frame, said cordage having an effective length corresponding to a distance between the hanger and the frame, and wherein both of the left side and the right side of the frame are oriented vertically and in parallel separated by a distance defining an adjustable width dimension of the collapsible frame,
    an adjustment means for adjusting the effective length of the cordage, the adjustment means being attached to an end portion of the cordage,
    at least one horizontally oriented pair of clips, wherein one clip of each pair is attached to the left side of the frame and the other clip of that pair is attached to the right side of the frame, where said pair of clips comprises a means for holding the portable electronic device between them,
    a first vertically oriented clip attached to a lower end of the left side of the frame for supporting a bottom edge of the electronic device, and a second vertically oriented clip attached to a lower end of the right side of the frame for supporting said bottom edge of said electronic device,
    wherein each of the left side of the frame and the right side of the frame further comprises a longitudinally extending groove for receiving and retaining at least one of a fastener therein, such that the groove provides a track means for allowing said fastener to travel longitudinally along that respective side of the frame within that groove,
    a top side of the frame comprising a top slat having a length dimension and a width dimension and a centerpoint in the plane defined by said length dimension and said width dimension,
    a bottom side of the frame comprising a bottom slat having said length dimension and a width dimension and a centerpoint in the plane defined by said length dimension and said width dimension,
    where said top slat is rotatably attached at its centerpoint to the centerpoint of said bottom slat by a pivot means, whereby the plane of the top slat lies parallel to the plane of the bottom slat, and such that the top slat and the bottom slat counter-rotates around the pivot means and thereby alternate between a first relative lengthwise orientation having a transverse configuration and a second relative lengthwise orientation having a parallel configuration; and
    wherein a left end of the top slat is connected to the left side of the frame by one of said fastener and a right end of the top slat is connected to the right side of the frame by another of said fastener,
    whereby a person who is using the apparatus, by moving the left side of the frame horizontally inwards and moving the right side of the frame horizontally inwards, causes the top slat and the bottom slat to counter-rotate towards said relative lengthwise orientation having the parallel configuration, thus reducing said adjustable width dimension of the collapsible frame,
    and whereby the person, by moving the left side of the frame horizontally outwards and moving the right side of the frame horizontally outwards, causes the top slat and
    the bottom slat to counter-rotate towards said relative lengthwise orientation having the transverse configuration, thus expanding said adjustable width dimension of the collapsible frame.

2. The apparatus of claim 1, where a left end of the bottom slat is connected to the left side of the frame by one of said fastener and a right end of the bottom slat is connected to the right side of the frame by another of said fastener.

3. The apparatus of claim 1, where a left end of the bottom slat is fixedly attached to a lower end portion of the left side of the frame and a right end of the bottom slat is fixedly attached to a lower end portion of the right side of the frame.

4. The apparatus of claim 1 wherein said fastener is adjustably secured in the groove by a tightening means for alternatively permitting and preventing its travel in the groove.

5. The apparatus of claim 1, further comprising a stabilizer attached to the cordage, the stabilizer comprising:
   a threadable stabilizer cleat that is longitudinally bisected by a threading means for retaining the stabilizer on the cordage, said threading means comprising a hollow tube-like passage wherein the cordage is threaded into a first end and out of a second end of said passage, and
   an underside of said cleat comprising a gripping means for contacting an external surface of an object in a mounting environment,
   whereby the stabilizer is adjustably positionable along said effective length of said cordage to effectuate an application of the gripping means upon the external surface of the object in the mounting environment.

6. The threadable stabilizer cleat of claim 5, further comprising a grip- enhancing means for modifying one or more properties of said application of the gripping means upon the external surface of the object in the mounting environment.

7. The threadable stabilizer cleat of claim 6, wherein the grip-enhancing means comprises a plurality of studs arranged in a contiguous grid-like array protruding outwards from said undersurface.

8. The threadable stabilizer cleat of claim 7, wherein the plurality of studs arranged in a contiguous grid-like array protrudes outwards from said undersurface by a distance of between roughly 0.1 millimeters and twenty (20) millimeters.

9. An apparatus for mounting a portable electronic device, the apparatus comprising:
   a mounting means connected to a hanger,
   cordage descending vertically from the hanger and attaching to a frame, said cordage having an effective length corresponding to a distance between the hanger and the frame,
   an adjustment means for adjusting the effective length of the cordage, the adjustment means being attached to an end portion of the cordage,
   at least one horizontally oriented pair of clips, comprising two opposing horizontal clips, for holding the portable electronic device between them, said horizontally oriented pair of clips being attached on two opposing lateral sides of the frame,
   at least one vertically oriented clip for supporting a bottom edge of the portable electronic device, said vertically oriented clip being attached to a bottom side of the frame, and,
   one or more of a stabilizer attached to said cordage, the stabilizer comprising: a threadable stabilizer cleat longitudinally bisected by a threading means for retaining the stabilizer on the cordage, said threading means comprising a hollow tube-like passage wherein the cordage is threaded into a first end and out of a second end of said passage,
   an underside of said cleat comprising a gripping means for contacting an external surface of an object in a mounting environment,
   whereby the stabilizer is adjustably positionable along said effective length of said cordage to effectuate an application of the gripping means upon the external surface of the object in the mounting environment and;
   wherein the grip-enhancing means comprises a plurality of studs arranged in a contiguous grid-like array protruding outwards from said undersurface.

10. The threadable stabilizer cleat of claim 9, further comprising a grip-enhancing means for modifying one or more properties of said application of the gripping means upon the external surface of the object in the mounting environment.

11. The threadable stabilizer cleat of claim 9, wherein the plurality of studs arranged in a contiguous grid-like array protrudes outwards from said undersurface by a distance of between roughly 0.1 millimeters and twenty (20) millimeters.

* * * * *